(12) United States Patent
Kim et al.

(10) Patent No.: US 9,501,139 B2
(45) Date of Patent: Nov. 22, 2016

(54) MOBILE TERMINAL AND CONTROL METHOD FOR THE MOBILE TERMINAL

(71) Applicant: LG Electronics Inc., Seoul (KR)

(72) Inventors: Minchul Kim, Seoul (KR); Jeonghyun Lee, Seoul (KR); Kyungmin Cho, Seoul (KR); Jaemoo Lee, Seoul (KR); Jongkyeong Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 30 days.

(21) Appl. No.: 14/171,497

(22) Filed: Feb. 3, 2014

(65) Prior Publication Data

US 2014/0354561 A1   Dec. 4, 2014

(30) Foreign Application Priority Data

Jun. 4, 2013  (KR) .................. 10-2013-0064212

(51) Int. Cl.
  *G06F 3/00* (2006.01)
  *G06F 3/041* (2006.01)
  *H04N 5/232* (2006.01)
  *H04N 5/235* (2006.01)

(52) U.S. Cl.
  CPC ............ *G06F 3/005* (2013.01); *G06F 3/041* (2013.01); *H04N 5/2356* (2013.01); *H04N 5/23216* (2013.01); *H04N 5/23293* (2013.01); *H04N 5/2355* (2013.01)

(58) Field of Classification Search
  CPC ............. H04N 5/23238; H04N 1/0044; G06F 3/041; G06F 3/03547; H04M 1/0264
  See application file for complete search history.

(56) References Cited

U.S. PATENT DOCUMENTS

| 2003/0050533 | A1* | 3/2003 | Minami ..................... 600/168 |
| 2008/0234849 | A1* | 9/2008 | Han ............................. 700/94 |
| 2011/0069189 | A1* | 3/2011 | Venkataraman et al. .. 348/218.1 |
| 2011/0085042 | A1* | 4/2011 | Lee et al. .................... 348/159 |
| 2011/0109581 | A1* | 5/2011 | Ozawa et al. ............... 345/173 |
| 2012/0307093 | A1  | 12/2012 | Miyoshi |

FOREIGN PATENT DOCUMENTS

| CN | 1630303 | 6/2005 |
| CN | 102736843 | 10/2012 |

(Continued)

OTHER PUBLICATIONS

Sakr, "Pelican Imaging's 16 lens array camera coming to smartphone," XP055169536, May 2013, 3 pages.

(Continued)

*Primary Examiner* — Michael Faragalla
*Assistant Examiner* — Chayce Bibbee
(74) *Attorney, Agent, or Firm* — Lee, Hong, Degerman, Kang & Waimey

(57) ABSTRACT

The present disclosure relates to a mobile terminal capable of image capture and a control method thereof. A mobile terminal according to an embodiment of the present disclosure may include a display unit, a camera arranged with a plurality of lenses along a plurality of lines, a controller configured to display images entered through the plurality of lenses in a preset arrangement on the display unit, and capture at least one of the images entered through the plurality of lenses in response to a capture request being received.

11 Claims, 26 Drawing Sheets

(56) References Cited

FOREIGN PATENT DOCUMENTS

| CN | 102938826 | 2/2013 |
|---|---|---|
| WO | 2013/076728 | 5/2013 |

OTHER PUBLICATIONS

Sun, et al., "Computational Camera and Photography—Multi-Layer 3D display," XP055169464, Sep. 2011, 4 pages.
Li, "A Faster Image Search," Webmaster Central Blog, XP055169473, Jan. 2013, 2 pages.
Burger, "Single Touch Zoom Gestures on a Mobile Device," XP055169478, Sep. 2010, 33 pages.
Lumsdaine, et al., "Computational Photography: Real Time Plenoptic Rendering," NVIDIA GPU Technology Conference, XP055169460, Sep. 2010, 57 pages.
European Patent Office Application Serial No. 14160533.7, Search Report dated Feb. 19, 2015, 9 pages.
The State Intellectual Property Office of the People's Republic of China Application Serial No. 201410093601.1, Office Action dated Nov. 25, 2015, 9 pages.

\* cited by examiner

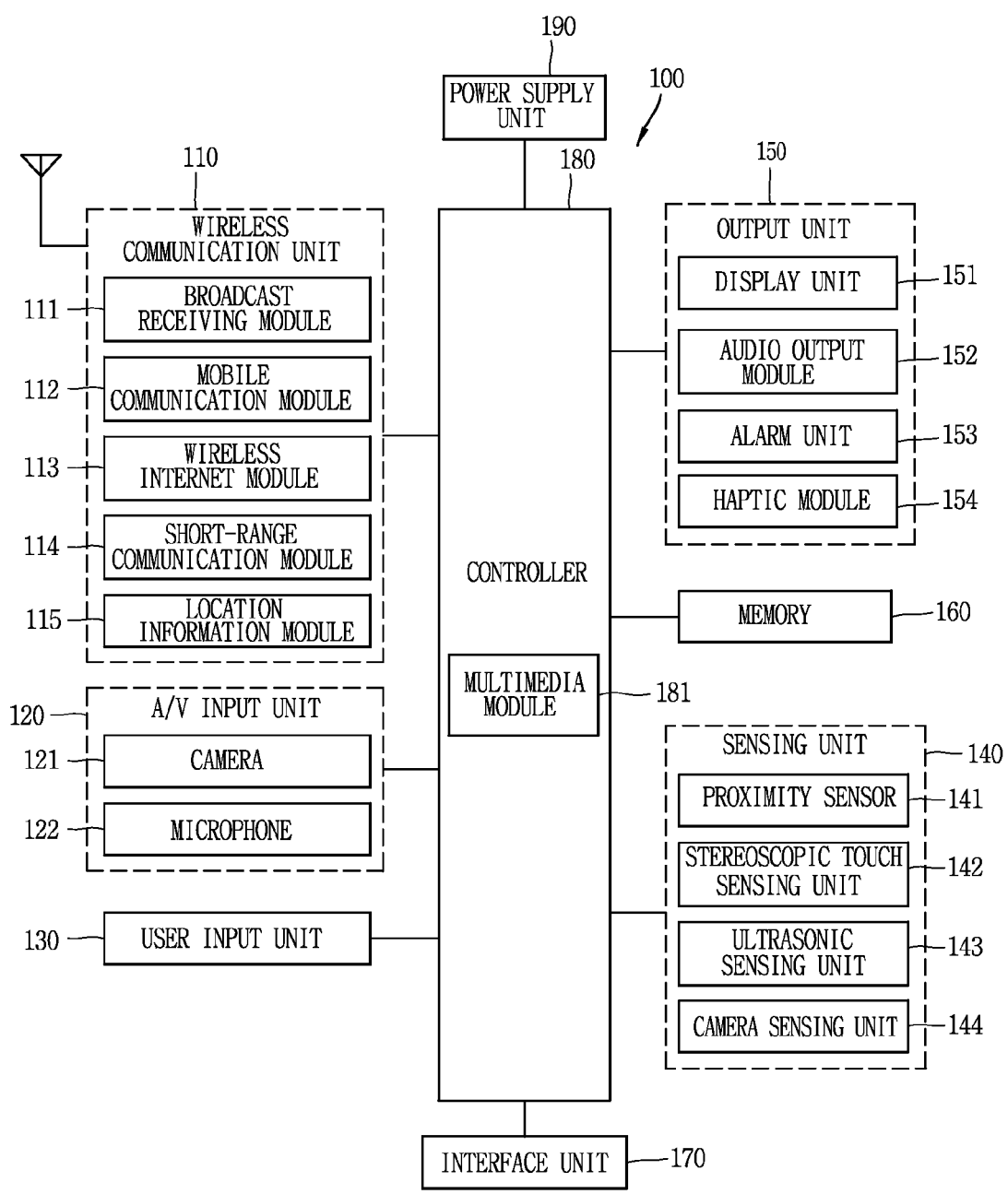

MOBILE TERMINAL AND CONTROL METHOD FOR THE MOBILE TERMINAL

RELATED APPLICATION

Pursuant to 35 U.S.C. §119(a), this application claims the benefit of earlier filing date and right of priority to Korean Application No. 10-2013-0064212, filed on Jun. 4, 2013, the contents of which are incorporated by reference herein in its entirety.

BACKGROUND OF THE INVENTION

1. Field of the Invention

The present disclosure relates to a mobile terminal capable of image capture and a control method thereof.

2. Description of the Related Art

A mobile terminal may be configured to perform various functions. The examples of such various functions may include a data and voice communication function, a function of capturing still or moving images through a camera, a voice storage function, a function of playing music files through a speaker system, an image or video display function, and the like. Some mobile terminals may include an additional function capable of implementing games, and some other mobile terminals may be implemented as a multimedia player. Moreover, recent mobile terminals may receive broadcast or multicast signals, thereby allowing a user to view video or television programs.

Furthermore, efforts for supporting and enhancing the functions of the mobile terminal have been continued. The foregoing efforts may include the improvement of software and hardware as well as the change or improvement of structural elements constituting a mobile terminal.

In addition, owing to the foregoing improvement, a mobile terminal may be provided with a camera including a plurality of lenses to capture a subject at a plurality of focal points through the camera.

SUMMARY OF THE INVENTION

An objective of the present disclosure relates to a mobile terminal for providing a user environment capable of intuitively controlling an image when the image is entered through a camera having a plurality of lenses, and a control method thereof.

In order to accomplish the foregoing objective, a mobile terminal according to an embodiment of the present disclosure may include a display unit, a camera arranged with a plurality of lenses along a plurality of lines, and a controller configured to display images entered through the plurality of lenses in a preset arrangement on the display unit and capture at least one of the images entered through the plurality of lenses in response to a capture request being received.

According to an embodiment, the controller may partition the display unit into a plurality of regions to correspond to a different number of the lenses, and display any one of the images entered through the plurality of lenses for each of the plurality of regions.

According to an embodiment, the preset arrangement may correspond to an order of arranging the plurality of lenses.

According to an embodiment, the controller may execute a function defined by a touch with a preset scheme in response to the application of a touch with the preset scheme to at least one of the plurality of regions being detected.

According to an embodiment, when the application of a first touch to any one of the plurality of regions is detected, the controller may enlarge the display size of an image being displayed in the any one region.

According to an embodiment, the controller may divide the display unit into a first region displayed with the enlarged image and a second region displayed with at least one image excluding the enlarged image among images that have been displayed in the plurality of regions, and change an image that has been displayed in the first region to any one image to which a touch input is applied when the touch input is applied to any one of the at least one image displayed in the second region.

According to an embodiment, when the capture request is received, the enlarged image and images entered through the other lenses excluding a lens corresponding to the enlarged image among the plurality of lenses may be captured at the same time.

According to an embodiment, the controller may display any one image in an enlarged size in correspondence to the any one of images entered through the plurality of lenses being selected, and when one region of the enlarged image is selected, the controller may display an image focused on the selected one region among images entered through the plurality of lenses in an enlarged size instead of the enlarged image.

According to an embodiment, the controller may change an active state for at least one of the plurality of lenses based on a touch input to a region displayed with images entered through the plurality of lenses.

According to an embodiment, when a touch with a preset scheme is applied to a region displayed with any one of images entered through the plurality of lenses, the controller may deactivate a lens that receives an image displayed in a region to which a touch with the preset scheme is applied.

According to an embodiment, when a drag touch is applied in subsequence to a touch with a preset scheme to the region, the controller may deactivate a lens that receives an image displayed in a region to which a touch with the preset scheme is applied and at least one lens that receives at least one image displayed in a region to which the drag touch is applied at the same time.

According to an embodiment, the controller may control the display unit such that the visual appearance of a region that has been displayed with an image that has been entered through the deactivated lens is distinguished from that of a region displayed with an image entered through an activated lens.

According to an embodiment, the display size of an image displayed in the any one region may be adjusted in response to a region displayed with any one of images entered through the plurality of lenses being dragged.

According to an embodiment, the display size of an image displayed in the any one region may correspond to the drag level, and the display size of another image displayed on the display unit may be changed at the same time in correspondence to the display size of the image being adjusted.

According to an embodiment, the controller may synthesize the attribute values of at least two images selected by the user among images displayed on the display unit to generate the synthesized image.

A control method of a mobile terminal comprising a camera arranged with a plurality of lenses along a plurality of lines according to an embodiment of the present disclosure may include displaying images entered through the plurality of lenses in a preset arrangement, receiving a capture request, and capturing at least one of the images entered through the plurality of lenses in correspondence to the capture request.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIG. 1 is a block diagram illustrating a mobile terminal according to an embodiment of the present disclosure;

DETAILED DESCRIPTION OF THE INVENTION

Figure 2A:
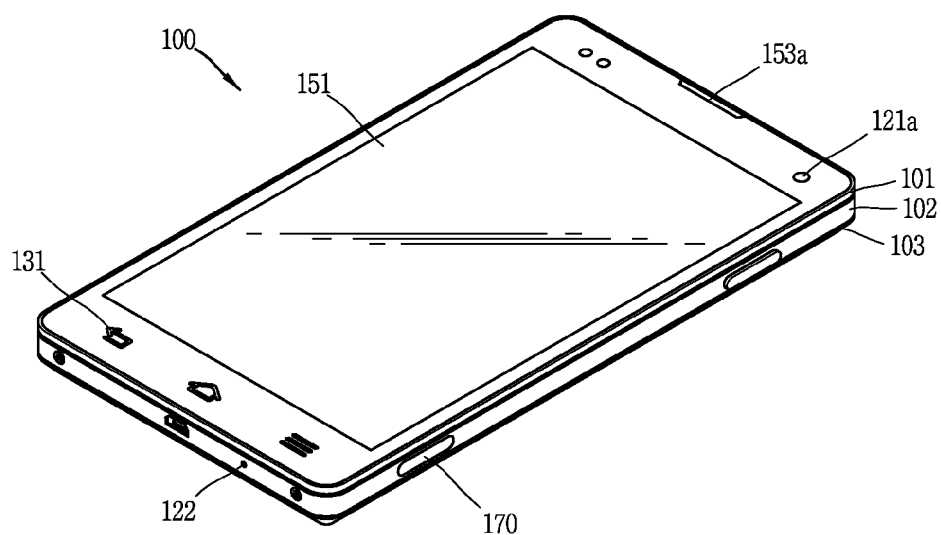
FIG. 2A is a front perspective view illustrating an example of a mobile terminal according to an embodiment of the present disclosure.

Hereinafter, preferred embodiments of the present invention will be described in detail with reference to the accompanying drawings, and the same or similar elements are designated with the same numeral references regardless of the numerals in the drawings and their redundant description will be omitted. A suffix "module" or "unit" used for constituent elements disclosed in the following description is merely intended for easy description of the specification, and the suffix itself does not give any special meaning or function. In describing the present invention, moreover, the detailed description will be omitted when a specific description for publicly known technologies to which the invention pertains is judged to obscure the gist of the present invention.

A mobile terminal disclosed herein may include a portable phone, a smart phone, a laptop computer, a digital broadcast mobile device, a personal digital assistant (PDA), a mobile multimedia player (PMP), a navigation, a slate PC, a tablet PC, an ultrabook, and the like. However, it would be easily understood by those skilled in the art that a configuration according to the following description may be applicable to a stationary terminal such as a digital TV, a desktop computer, and the like, excluding constituent elements particularly configured for mobile purposes.

FIG. 1 is a block diagram illustrating a mobile terminal 100 according to an embodiment disclosed in the present disclosure.

The mobile terminal 100 may include a wireless communication unit 110, an audio/video (A/V) input unit 120, a user input unit 130, a sensing unit 140, an output unit 150, a memory 160, an interface unit 170, a controller 180, a power supply unit 190, and the like. However, the constituent elements as illustrated in FIG. 1 are not necessarily required, and the mobile communication terminal may be implemented with greater or less number of elements than those illustrated elements.

Hereinafter, the foregoing constituent elements will be described in sequence.

The wireless communication unit 110 may include one or more modules allowing radio communication between the mobile terminal 100 and a wireless communication system, or allowing radio communication between the mobile terminal 100 and a network in which the mobile terminal 100 is located. For example, the wireless communication unit 110 may include at least one of a broadcast receiving module 111, a mobile communication module 112, a wireless Internet module 113, a short-range communication module 114, a location information module 115, and the like.

The broadcast receiving module 111 receives a broadcast signal and/or broadcast associated information from an external broadcast managing entity via a broadcast channel.

The broadcast channel may include a satellite channel and a terrestrial channel. The broadcast managing entity may indicate a server which generates and transmits a broadcast signal and/or broadcast associated information or a server which receives a pre-generated broadcast signal and/or broadcast associated information and sends them to the mobile terminal. The broadcast signal may be implemented as a TV broadcast signal, a radio broadcast signal, and a data broadcast signal, among others. The broadcast signal may further include a data broadcast signal combined with a TV or radio broadcast signal.

Examples of broadcast associated information may include information associated with a broadcast channel, a broadcast program, a broadcast service provider, and the like. The broadcast associated information may be provided via a mobile communication network, and received by the mobile communication module 112.

The broadcast associated information may be implemented in various formats. For instance, broadcast associated information may include Electronic Program Guide (EPG) of Digital Multimedia Broadcasting (DMB), Electronic Service Guide (ESG) of Digital Video Broadcast-Handheld (DVB-H), and the like.

The broadcast receiving module 111 may be configured to receive digital broadcast signals transmitted from various types of broadcast systems. Such broadcast systems may include Digital Multimedia Broadcasting-Terrestrial (DMB- T), Digital Multimedia Broadcasting-Satellite (DMB-S), Media Forward Link Only (MediaFLO), Digital Video Broadcast-Handheld (DVB-H), Integrated Services Digital Broadcast-Terrestrial (ISDB-T) and the like. Of course, the broadcast receiving module 111 may be configured to be suitable for every broadcast system transmitting broadcast signals as well as the digital broadcasting systems.

Broadcast signals and/or broadcast associated information received via the broadcast receiving module 111 may be stored in a memory 160.

The mobile communication module 112 transmits and receives wireless signals to and from at least one a base station, an external terminal and a server on a mobile communication network. Here, the wireless signals may include audio call signals, video call signals, or various formats of data according to the transmission and reception of text/multimedia messages.

The mobile communication module 112 may be configured to implement an video communication mode and a voice communication mode. The video communication mode refers to a configuration in which communication is made while viewing the image of the counterpart, and the voice communication mode refers to a configuration in which communication is made without viewing the image of the counterpart. The mobile communication module 112 may be configured to transmit or receive at least one of audio or video data to implement the video communication mode and voice communication mode.

The wireless Internet module 113 refers to a module for supporting wireless Internet access, and may be built-in or externally installed on the mobile terminal 100. Here, it may be used a wireless Internet access technique including WLAN (Wireless LAN), Wi-Fi (Wireless Fidelity) Direct, DLNA (Digital Living Network Alliance), Wibro (Wireless Broadband), Wimax (World Interoperability for Microwave Access), HSDPA (High Speed Downlink Packet Access), and the like.

The short-range communication module 114 refers to a module for supporting a short-range communication. Here, it may be used a short-range communication technology including Bluetooth™, Radio Frequency IDentification (RFID), Infrared Data Association (IrDA), Ultra WideBand (UWB), ZigBee, Near Field Communication (NFC) and the like.

The location information module 115 is a module for checking or acquiring the location of the mobile terminal, and there is a Global Positioning Module (GPS) module or Wireless Fidelity (WiFi) as a representative example.

Referring to FIG. 1, the A/V (audio/video) input unit 120 receives an audio or video signal, and the A/V (audio/video) input unit 120 may include a camera 121 and a microphone 122. The camera 121 processes image frames, such as still or moving images, obtained by an image sensor in a video phone call or image capturing mode. The processed image frame may be displayed on a display unit 151.

The image frames processed by the camera 121 may be stored in the memory 160 or transmitted to an external device through the wireless communication unit 110. Furthermore, the user's location information or the like may be produced from image frames acquired from the camera 121. Two or more cameras 121 may be provided according to the use environment.

The microphone 122 receives an external audio signal through a microphone in a phone call mode, a recording mode, a voice recognition mode, and the like, and processes the audio signal into electrical voice data. The processed voice data may be converted and outputted into a format that is transmittable to a mobile communication base station through the mobile communication module 112 in the phone call mode. The microphone 122 may implement various types of noise canceling algorithms to cancel noise generated in a procedure of receiving the external audio signal.

The user input unit 130 may generate input data to control an operation of the terminal. The user input unit 130 may be configured by including a keypad, a dome switch, a touch pad (pressure/capacitance), a jog wheel, a jog switch, and the like.

The sensing unit 140 detects a current status of the mobile terminal 100 such as an opened or closed configuration of the mobile terminal 100, a location of the mobile terminal 100, a presence or absence of user contact with the mobile terminal 100, an orientation of the mobile terminal 100, an acceleration/deceleration of the mobile terminal 100, and the like, so as to generate a sensing signal for controlling the operation of the mobile terminal 100. For example, when the mobile terminal 100 is a slide phone type, the sensing unit 140 may sense whether a sliding portion of the mobile terminal is open or closed. Other examples include sensing functions, such as the sensing unit 140 sensing the presence or absence of power provided by the power supply unit 190, the presence or absence of a coupling between the interface unit 170 and an external device.

The sensing unit 140 may include a proximity sensor 141, a stereoscopic touch sensing unit 142, an ultrasonic sensing unit 143 and a camera sensing unit 144. The sensing unit 140 may be configured with a three-dimensional sensor for detecting the location of an object (hereinafter, referred to as a "sensing object") that exists and moves in a three-dimensional space. Here, the sensing object may be part (finger) of the user's body, an accessory device and the like.

The output unit 150 is configured to generate an output associated with visual sense, auditory sense or tactile sense, and may include a display unit 151, an audio output module 152, an alarm unit 153, a haptic module 154, and the like.

The display unit 151 may display (output) information processed in the mobile terminal 100. For example, when the mobile terminal 100 is in a phone call mode, the display unit 151 may display a User Interface (UI) or a Graphic User Interface (GUI) associated with a call. When the mobile terminal 100 is in a video call mode or image capturing mode, the display unit 151 may display a captured image and/or received image, a UI or GUI.

The display unit 151 may include at least one of a Liquid Crystal Display (LCD), a Thin Film Transistor-LCD (TFT-LCD), an Organic Light Emitting Diode (OLED) display, a flexible display, a three-dimensional (3D) display, and an e-ink display.

Some of those displays may be configured with a transparent or optical transparent type to allow viewing of the exterior through the display unit, which may be called transparent displays. An example of the typical transparent displays may include a transparent LCD (TOLED), and the like. Under this configuration, a user can view an object positioned at a rear side of a mobile terminal body through a region occupied by the display unit 151 of the mobile terminal body.

Two or more display units 151 may be implemented according to a configured aspect of the mobile terminal 100. For instance, a plurality of the display units 151 may be arranged on one surface to be spaced apart from or integrated with each other, or may be arranged on different surfaces.

When the display unit 151 and a touch sensitive sensor (hereinafter, referred to as a "touch sensor") have an interlayer structure (hereinafter, referred to as a "touch screen"), the display unit 151 may be used as an input device in addition to an output device. The touch sensor may be implemented as a touch film, a touch sheet, a touch pad, and the like.

The touch sensor may be configured to convert changes of a pressure applied to a specific part of the display unit 151, or a capacitance occurring from a specific part of the display unit 151, into electric input signals. The touch sensor may be configured to sense not only a touched position and a touched area, but also a touch pressure at which a touch object body is touched on the touch sensor. Here, the touch object body may be a finger, a touch pen or stylus pen, a pointer, or the like as an object by which a touch is applied to the touch sensor.

When there is a touch input to the touch sensor, the corresponding signals are transmitted to a touch controller. The touch controller processes the signal(s), and then transmits the corresponding data to the controller 180. Accordingly, the controller 180 may sense which region of the display unit 151 has been touched.

Referring to FIG. 1, a proximity sensor 141 may be arranged at an inner region of the mobile device 100 surrounded by the touch screen, or adjacent to the touch screen. The proximity sensor 141 may be provided as an example of the sensing unit 140. The proximity sensor 141 refers to a sensor to sense the presence or absence of an object approaching to a surface to be sensed, or an object disposed adjacent to a surface to be sensed, by using an electromagnetic field or infrared rays without a mechanical contact. The proximity sensor 141 has a longer lifespan and a more enhanced utility than a contact sensor.

The examples of the proximity sensor 141 may include an optical transmission type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and so on. When the touch screen is implemented as a capacitance type, the proximity of an object having conductivity (hereinafter, referred to as a "pointer") to the touch screen is sensed by changes of an electromagnetic field. In this case, the touch screen (touch sensor) may be categorized into a proximity sensor.

Hereinafter, for the sake of convenience of brief explanation, a behavior that the pointer is positioned to be proximate onto the touch screen without contact will be referred to as a "proximity touch", whereas a behavior that the pointer substantially comes in contact with the touch screen will be referred to as a "contact touch". For the position corresponding to the proximity touch of the pointer on the touch screen, such position corresponds to a position where the pointer faces perpendicular to the touch screen upon the proximity touch of the pointer.

The proximity sensor 141 senses a proximity touch, and a proximity touch pattern (e.g., proximity touch distance, proximity touch direction, proximity touch speed, proximity touch time, proximity touch position, proximity touch moving status, etc.). Information relating to the sensed proximity touch and the sensed proximity touch patterns may be output onto the touch screen.

The audio output module 152 may output audio data received from the wireless communication unit 110 or stored in the memory 160, in a call-receiving mode, a call-placing mode, a recording mode, a voice recognition mode, a broadcast reception mode, and so on. The audio output module 152 may output audio signals relating to the functions performed in the mobile terminal 100 (e.g., sound alarming a call received or a message received, and so on). The audio output module 152 may include a receiver, a speaker, a buzzer, and so on.

The alarm unit 153 outputs signals notifying occurrence of events from the mobile terminal 100. The events occurring from the mobile terminal 100 may include call received, message received, key signal input, touch input, and so on. The alarm unit 153 may output not only video or audio signals, but also other types of signals such as signals notifying occurrence of events in a vibration manner. Since the video or audio signals can be output through the display unit 151 or the audio output module 152, the display unit 151 and the audio output module 152 may be categorized into part of the alarm unit 153.

The haptic module 154 generates various tactile effects which a user can feel. A representative example of the tactile effects generated by the haptic module 154 includes vibration. Vibration generated by the haptic module 154 may have a controllable intensity, a controllable pattern, and so on. For instance, different vibration may be output in a synthesized manner or in a sequential manner.

The haptic module 154 may generate various tactile effects, including not only vibration, but also arrangement of pins vertically moving with respect to a skin being touched, air injection force or air suction force through an injection hole or a suction hole, touch by a skin surface, presence or absence of contact with an electrode, effects by stimulus such as an electrostatic force, reproduction of cold or hot feeling using a heat absorbing device or a heat emitting device, and the like.

The haptic module 154 may be configured to transmit tactile effects through a user's direct contact, or a user's muscular sense using a finger or a hand. The haptic module 155 may be implemented in two or more in number according to the configuration of the mobile terminal 100.

The memory 160 may store a program for processing and controlling the controller 180. Alternatively, the memory 160 may temporarily store input/output data (e.g., phonebook, messages, still images, videos, and the like). Also, the memory 160 may store data related to various patterns of vibrations and sounds outputted upon the touch input on the touch screen.

The memory 160 may be implemented using any type of suitable storage medium including a flash memory type, a hard disk type, a multimedia card micro type, a memory card type (e.g., SD or DX memory), Random Access Memory (RAM), Static Random Access Memory (SRAM), Read-Only Memory (ROM), Electrically Erasable Programmable Read-only Memory (EEPROM), Programmable Read-only Memory (PROM), magnetic memory, magnetic disk, optical disk, and the like. Also, the mobile terminal 100 may operate in association with a web storage which performs the storage function of the memory 160 on the Internet.

The interface unit 170 may generally be implemented to interface the mobile terminal with external devices connected to the mobile terminal 100. The interface unit 170 may allow a data reception from an external device, a power delivery to each component in the mobile terminal 100, or a data transmission from the mobile terminal 100 to an external device. The interface unit 170 may include, for example, wired/wireless headset ports, external charger ports, wired/wireless data ports, memory card ports, ports for coupling devices having an identification module, audio Input/Output (I/O) ports, video I/O ports, earphone ports, and the like.

On the other hand, the identification module may be configured as a chip for storing various information required to authenticate an authority to use the mobile terminal 100, which may include a User Identity Module (UIM), a Subscriber Identity Module (SIM), and the like. Also, the device having the identification module (hereinafter, referred to as "identification device") may be implemented in a type of smart card. Hence, the identification device can be coupled to the mobile terminal 100 via the interface unit 170.

Furthermore, the interface unit 170 may serve as a path for power to be supplied from an external cradle to the mobile terminal 100 when the mobile terminal 100 is connected to the external cradle or as a path for transferring various command signals inputted from the cradle by a user to the mobile terminal 100. Such various command signals or power inputted from the cradle may operate as signals for recognizing that the mobile terminal 100 has accurately been mounted to the cradle.

The controller 180 typically controls the overall operations of the mobile terminal 100. For example, the controller 180 performs the control and processing associated with telephony calls, data communications, video calls, and the like. The controller 180 may include a multimedia module 181 which provides multimedia playback. The multimedia module 181 may be configured as part of the controller 180 or as a separate component.

Furthermore, the controller 180 can perform a pattern recognition processing so as to recognize writing or drawing input carried out on the touch screen as text or image.

Furthermore, the controller 180 may implement a lock state for limiting the user's control command input to applications when the state of the mobile terminal satisfies a preset condition. Furthermore, the controller 180 may control a lock screen displayed in the lock state based on a touch input sensed through the display unit 151 in the lock state.

The power supply unit 190 receives external and internal power to provide power required for various components under the control of the controller 180.

Various embodiments described herein may be implemented in a computer or similar device readable medium using software, hardware, or any combination thereof.

For hardware implementation, it may be implemented by using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and electrical units designed to perform the functions described herein. In some cases, such embodiments may be implemented in the controller 180 itself.

For software implementation, the embodiments such as procedures or functions described in the present disclosure may be implemented with separate software modules. Each of the software modules may perform at least one function or operation described in the present disclosure.

Software codes can be implemented by a software application written in any suitable programming language. The software codes may be stored in the memory 160 and executed by the controller 180.

Hereinafter, a mobile terminal according to an embodiment of the present disclosure as illustrated above in FIG. 1 or a mobile terminal disposed with the constituent elements of the mobile terminal or the structure of a mobile terminal will be described.

Figure 2B:
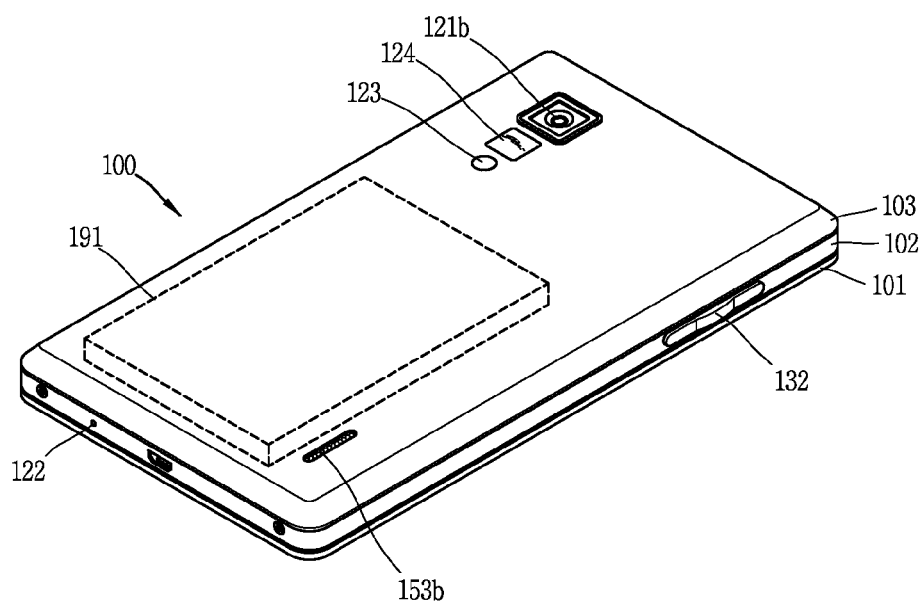
FIG. 2B is a rear perspective view illustrating an example of a mobile terminal according to an embodiment of the present disclosure.

FIG. 2A is a front perspective view illustrating a mobile terminal according to the present disclosure or an example of the mobile terminal, and FIG. 2B is a rear perspective view illustrating a mobile terminal illustrated in FIG. 2A.

The mobile terminal 100 disclosed herein is provided with a bar-type terminal body. However, the present invention is not only limited to this type of terminal, but also applicable to various structures of terminals such as slide type, folder type, swivel type, swing type, and the like, in which two and more bodies are combined with each other in a relatively movable manner.

According to the drawing, the terminal body 100 (hereinafter, referred to as a "body") may include a front surface, a lateral surface, and a rear surface. Furthermore, the body may include both ends thereof formed along the length direction.

The body 100 includes a case (casing, housing, cover, etc.) forming an appearance of the terminal. In this embodiment, the case may be divided into a front surface (hereinafter, referred to as a "front case") 101 and a rear surface (hereinafter, referred to as a "rear case") 102. Various electronic components may be incorporated into a space formed between the front case 101 and rear case 102. At least one middle case may be additionally disposed between the front case 101 and the rear case 102.

The cases may be formed by injection-molding a synthetic resin or may be also formed of a metal material such as stainless steel (STS), titanium (Ti), or the like.

A display unit 151, an audio output module 152, a camera 121, a user input unit 130/131, 132, a microphone 122, an interface 170, and the like may be arranged on the terminal body 100, mainly on the front case 101.

The display unit 151 occupies a most portion of the front case 101. The audio output unit 152 and the camera 121 are disposed on a region adjacent to one of both ends of the display unit 151, and the user input unit 131 and the microphone 122 are disposed on a region adjacent to the other end thereof. The user interface 132 and the interface 170, and the like, may be disposed on a lateral surface of the front case 101 and the rear case 102. On the contrary, the microphone 122 may be disposed at the other end of the body 100.

The user input unit 130 is manipulated to receive a command for controlling the operation of the portable terminal 100, and may include a plurality of manipulation units 131, 132. The manipulation units 131, 132 may be commonly designated as a manipulating portion, and any method may be employed if it is a tactile manner allowing the user to perform manipulation with a tactile feeling.

The content inputted by the manipulation units 131, 132 may be set in various ways. For example, the first manipulation unit 131 may receive a command, such as start, end, scroll, or the like, and the second manipulation unit 132 may receive a command, such as controlling a volume level being outputted from the audio output unit 152, or switching it into a touch recognition mode of the display unit 151.

Referring to FIG. 2B, an audio output unit 152' may be additionally disposed on a rear surface, namely, a rear case 102, of the terminal body. The audio output unit 152' together with the audio output unit 152 (refer to FIG. 2A) can implement a stereo function, and it may be also used to implement a speaker phone mode during a phone call.

A power supply unit 190 for supplying power to the mobile terminal 100 may be mounted on a rear surface of the terminal body. The power supply unit 190 may be configured so as to be incorporated in the terminal body, or directly detachable from the outside of the terminal body.

Furthermore, a touch pad 135 for detecting a touch may be additionally mounted on the rear case 102. The touch pad

135 may be configured in an optical transmission type similarly to the display unit 151. In this case, if the display unit 151 is configured to output visual information from both sides of the display unit 151, then the visual information may be also recognized through the touch pad 135. The information being outputted from the both sides thereof may be controlled by the touch pad 135. In addition, a display may be additionally mounted on the touch pad 135, and a touch screen may be also disposed on the rear case 102.

Furthermore, a camera 121' may be additionally mounted on the rear case 102 of the terminal body. The camera 121' has an image capturing direction, which is substantially opposite to the direction of the camera 121 (refer to FIG. 2A), and may have different pixels from those of the first video input unit 121.

For example, that the camera 121 may preferably have a relatively small number of pixels enough not to cause a difficulty when the user captures his or her own face and sends it to the other party during a video call or the like, and the camera 121' has a relatively large number of pixels since the user often captures a general object that is not sent immediately. The cameras 121' may be provided in the terminal body 100 in a rotatable and popupable manner.

A flash 123 and a mirror 124 may be additionally disposed adjacent to the camera 121'. The flash 123 illuminates light toward an object when capturing the object with the camera 121'. The mirror allows the user to look at his or her own face, or the like, in a reflected way when capturing himself or herself (in a self-portrait mode) by using the camera 121'.

An audio output unit 252' may be additionally disposed on a rear surface of the terminal body. The audio output unit 252' together with the audio output unit 252 (refer to FIG. 2A) can implement a stereo function, and it may be also used to implement a speaker phone mode during a phone call.

Furthermore, a power supply unit 190 for supplying power to the portable terminal 100 may be mounted on a rear surface of the terminal body. The power supply unit 190 may be configured so as to be incorporated in the terminal body, or directly detachable from the outside of the terminal body.

A touch pad 135 for detecting a touch may be additionally mounted on the rear case 102. The touch pad 135 may be configured in an optical transmission type similarly to the display unit 151. In this case, if the display unit 151 is configured to output visual information from both sides of the display unit 151, then the visual information may be also recognized through the touch pad 135. The information being outputted from the both sides thereof may be controlled by the touch pad 135. In addition, a display may be additionally mounted on the touch pad 135, and a touch screen may be also disposed on the rear case 102.

The touch pad 135 operates in a reciprocal relation to the display unit 151 of the front case 101. The touch pad 135 may be disposed in parallel on a rear side of the display unit 151. The touch pad 135 may have the same or a smaller size as or than that of the display unit 151.

Figure 2C:
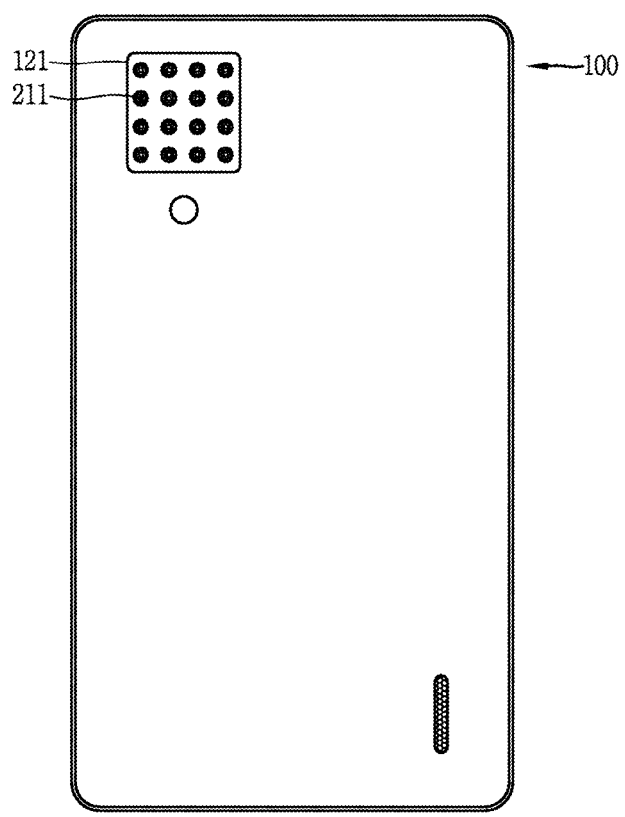
FIG. 2C is a rear perspective view illustrating an example of a mobile terminal according to another embodiment of the present disclosure.

Furthermore, a mobile terminal including at least one or more of the foregoing constituent elements according to an embodiment of the present disclosure may include a camera arranged with a plurality of lenses along a plurality of lines as illustrated in FIG. 2C. The camera arranged with a plurality of lenses may be referred to as an "array camera". As illustrated in the drawing, a plurality of lenses may be arranged in a matrix format on the array camera.

Figure 3:
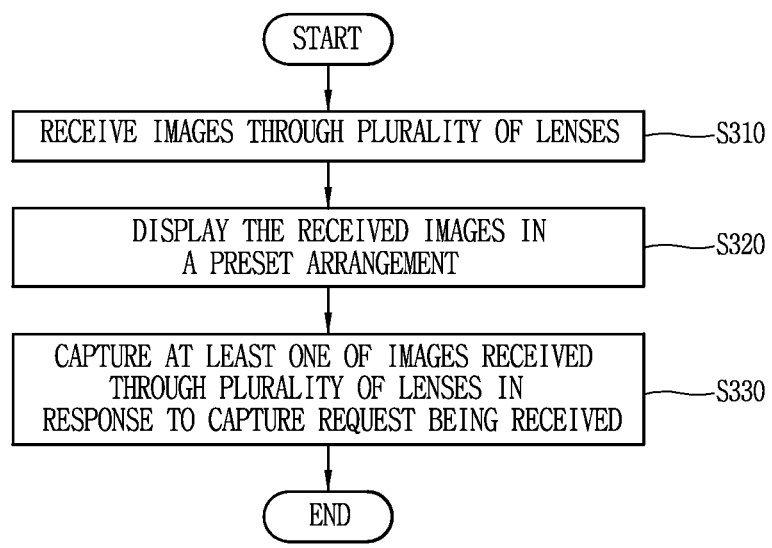
FIG. 3 is a flow chart for explaining a method of displaying and capturing an image entered through a camera in a mobile terminal according to an embodiment of the present disclosure.

Hereinafter, when an image is entered through a camera provided with a plurality of lenses, a method of providing a graphical user interface (GUI) capable of allowing a user to easily control images entered through a plurality of lenses will be described in more detail with reference to the accompanying drawings. FIG. 3 is a flow chart for explaining a method of displaying and capturing an image entered through a camera in a mobile terminal according to an embodiment of the present disclosure, and FIGS. 4A, 4B, 4C and 4D are conceptual views for explaining a method of displaying an image in a mobile terminal according to an embodiment of the present disclosure.

The process of receiving an image (or image signal) through a plurality of lenses arranged on an array camera is carried out (S310). Here, the image may be received when a function for image capture is executed or the camera is activated. The function for image capture may be executed when a camera related application is activated. Furthermore, the camera related application may be activated when an icon (or graphic object) of the camera related application displayed on the display unit is selected.

Furthermore, when the function for image capture is executed (or camera is activated), the controller 180 may receive all images through a plurality of lenses (or allow all images to be entered through a plurality of lenses), or an image using at least one of a plurality of lenses. The controller 180 may receive an image through a plurality of all lenses or receive an image through at least one of the plurality of lenses during the activation of a camera according to the camera related setting information. Hereinafter, an embodiment in which an image is received through a plurality of all lenses arranged on a camera will be primarily described.

On the other hand, as illustrated in the step S310, when an image is received (or entered) through a plurality of lenses, the process of displaying the received or entered images in a preset arrangement on the display unit is carried out (S320).

Figure 4A:
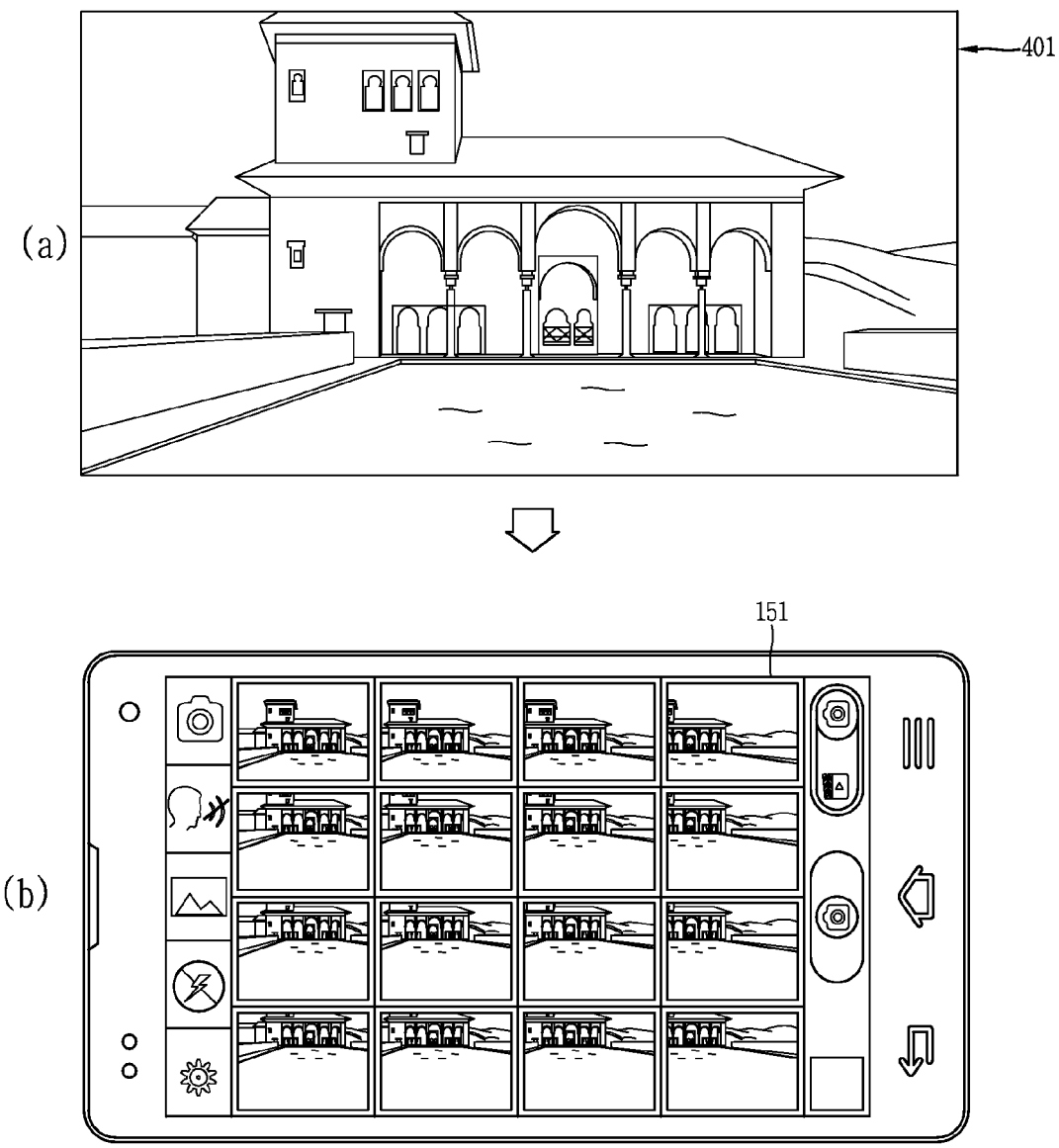
FIGS. 4A, 4B, 4C and 4D are conceptual views for explaining a method of displaying an image in a mobile terminal according to an embodiment of the present disclosure.

For example, when sixteen lenses are arranged on a camera, and an image for a subject 401 as illustrated in FIG. 4A(a) is received through the sixteen lenses, images entered through the sixteen lenses may be all displayed on the display unit 151 as illustrated in FIG. 4A(b).

Here, the arrangement of images being entered through the plurality of lenses displayed on the display unit 151 can be modified in various arrangements. The arrangement of the images may be changed based on the user's selection. The user may change an arrangement placed with images through the setting menu of an application corresponding to the camera function or the like.

Figure 4B:
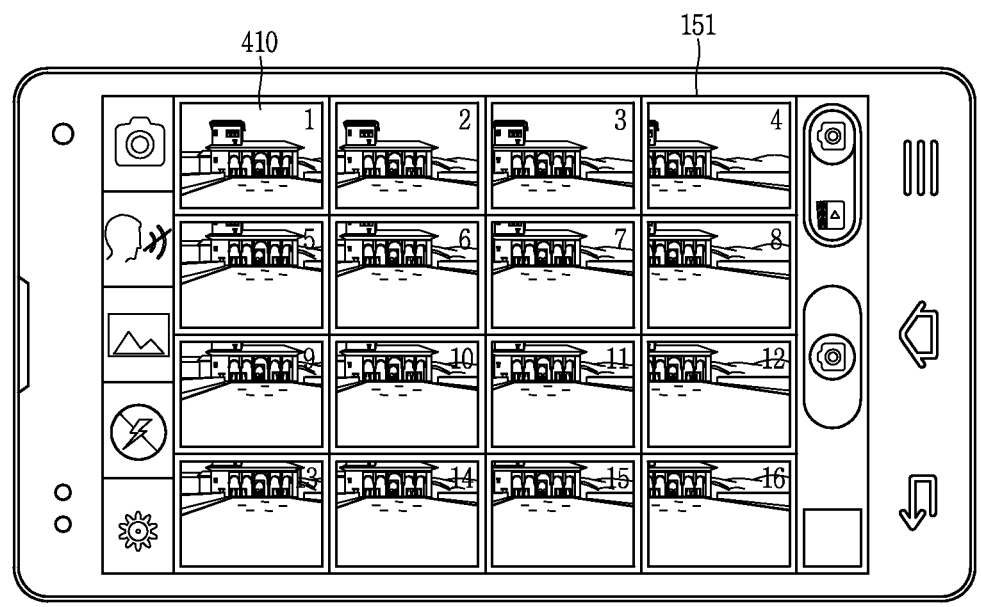

As an example, the controller 180 may arrange images to correspond to a location placed with lenses as illustrated in FIG. 4B. For example, as illustrated in FIG. 2C, an image 410 entered through a first lens 211 may be displayed at a location at which the first lens is placed among a plurality of lenses placed on a camera. In this manner, the controller 180 may display images placed with each lens, respectively, to correspond to a location at which the each lens is placed.

As a result, the preset arrangement may correspond to an order of arranging the plurality of lenses.

On the other hand, the controller 180 may partition the display unit into a plurality of regions to correspond to the number of the plurality of lenses, and display any one of the images entered through the plurality of lenses for each of the plurality of regions. For example, when the number of lenses is sixteen, the controller 180 may partition the display unit into sixteen regions, and display each image in the partitioned sixteen regions, respectively. Different images are displayed in the partitioned sixteen regions, and the different images are images entered through a plurality of lenses.

Figure 4C:
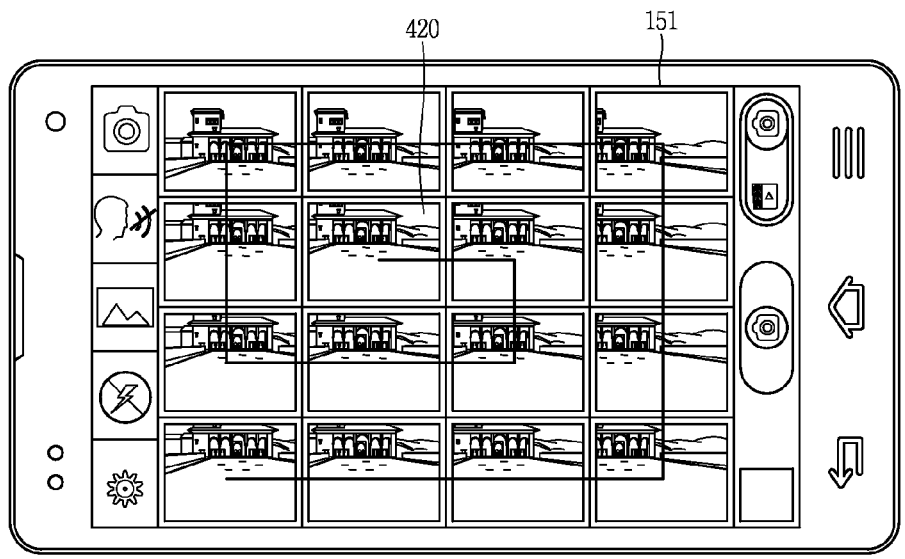

For another example, the controller 180 may sequentially arrange images entered through lenses adjacent to the first lens 211 along a preset direction based on an image 420 entered through the first lens 211 like drawing a circle in the outward direction from the inside (or in the inward direction from the outside, though not illustrated in the drawing) as illustrated in FIG. 4C. On the other hand, a location at which the reference image 420 is placed may be modified in various ways in addition to the location illustrated in FIG. 4C. Meanwhile, the first lens 211 may be another lens other than the lens illustrated in FIG. 2C depending on the definition.

Figure 4D:
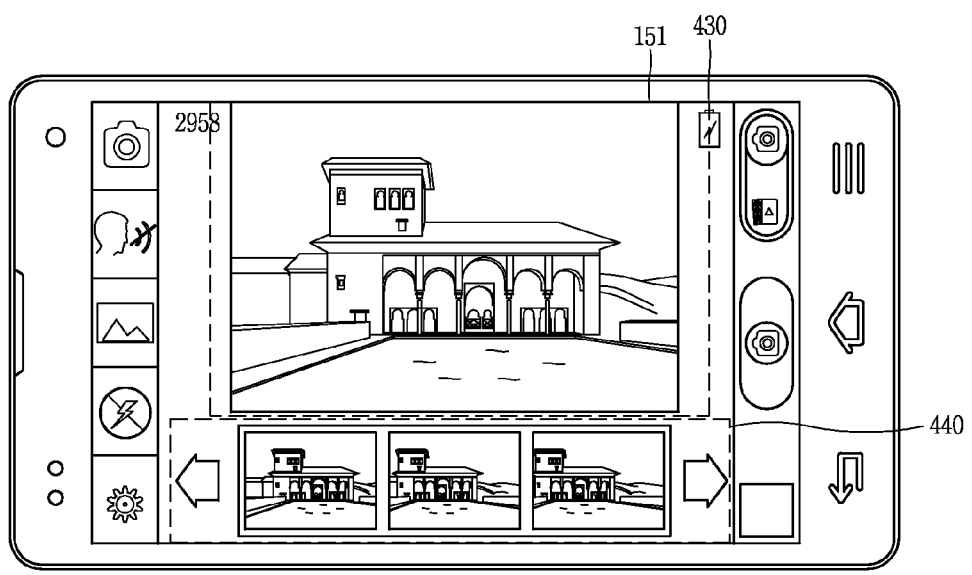

For still another example, as illustrated in FIG. 4D, the controller 180 may partition the display unit 151 into a plurality of regions 430, 440, and display any one image 430 among the images entered through a plurality of lenses in an enlarged size compared to the other images, and display at least one image excluding the any one image 430 in the region 440 which is different from the one region 430. Images displayed in the other one region 440 may be displayed in a thumbnail format. Meanwhile, at least one of images displayed in the other one region 440 may be changed based on a touch input to the one region 440 or an icon for changing an image displayed in the one region 440 being selected. Furthermore, at least one of images displayed in the other one region 440 may be changed to at least one different image in correspondence to any one image displayed in the one region 440 being dragged, flicked or swiped.

On the other hand, during the step S320, an image displayed on the display unit 151 may be a preview image. Here, the "preview image" is an image merely entered through a lens prior to receiving a capture request for capturing an image entered through a camera, and the preview image may not be stored in the memory 160 (not shown). Accordingly, the preview image may be changed according to the focal point of the camera being changed. Consequently, an image displayed on the display unit can be changed in real time.

On the other hand, when a capture request is received in a state that imaged entered through a plurality of lenses are displayed on the display unit 151, the process of capturing at least one of images entered through a plurality of lenses in response to this is carried out (S330). Here, capturing denotes storing an image entered through a camera (or lens) at a time point at which the capture request is received or a time point corresponding to the time point. When the capture request is received, the controller 180 may store at least one of images entered through lenses in the memory 160.

The controller 180 may determine whether to store a plurality of all images or selectively store at least one of them according to the user's selection or camera related setting information.

When the plurality of images are all stored, the controller 180 may individually store the images, for example, sixteen images, in case where there are sixteen lenses. Furthermore, the controller 180 may synthesize and store the plurality of images into one image. For example, as illustrated in FIG. 4A(b), images may be synthesized and stored to display all sixteen images on one screen. Furthermore, the controller 180 may store the plurality of images as one image while at the same time individually storing the plurality of images. The method of storing the plurality of images may be changed in various ways according to the user's selection.

Furthermore, when a capture command is received, the controller 180 may capture images entered through a plurality of lenses at predetermined time intervals. For example, the plurality of images can be captured with a delayed time of 0.1 second interval. The time interval at which images are captured can be changed according to the user's selection.

Furthermore, the controller 180 can also generate a video file using the captured images.

As described above, in a mobile terminal and a control method thereof according to an embodiment of the present disclosure, a plurality of images entered through a camera provided with a plurality of lenses may be displayed on one screen, thereby providing images entered through lenses having different focal points at once to the user.

Hereinafter, a method of controlling the display state of images in a state that the images entered through a plurality of lenses are displayed on the display unit will be described in more detail with reference to the accompanying drawings. FIGS. 5A, 5B, 6A, 6B, 6C and 7 are conceptual views for explaining a method of adjusting the size of an image displayed on a mobile terminal according to an embodiment of the present disclosure.

Figure 5A:
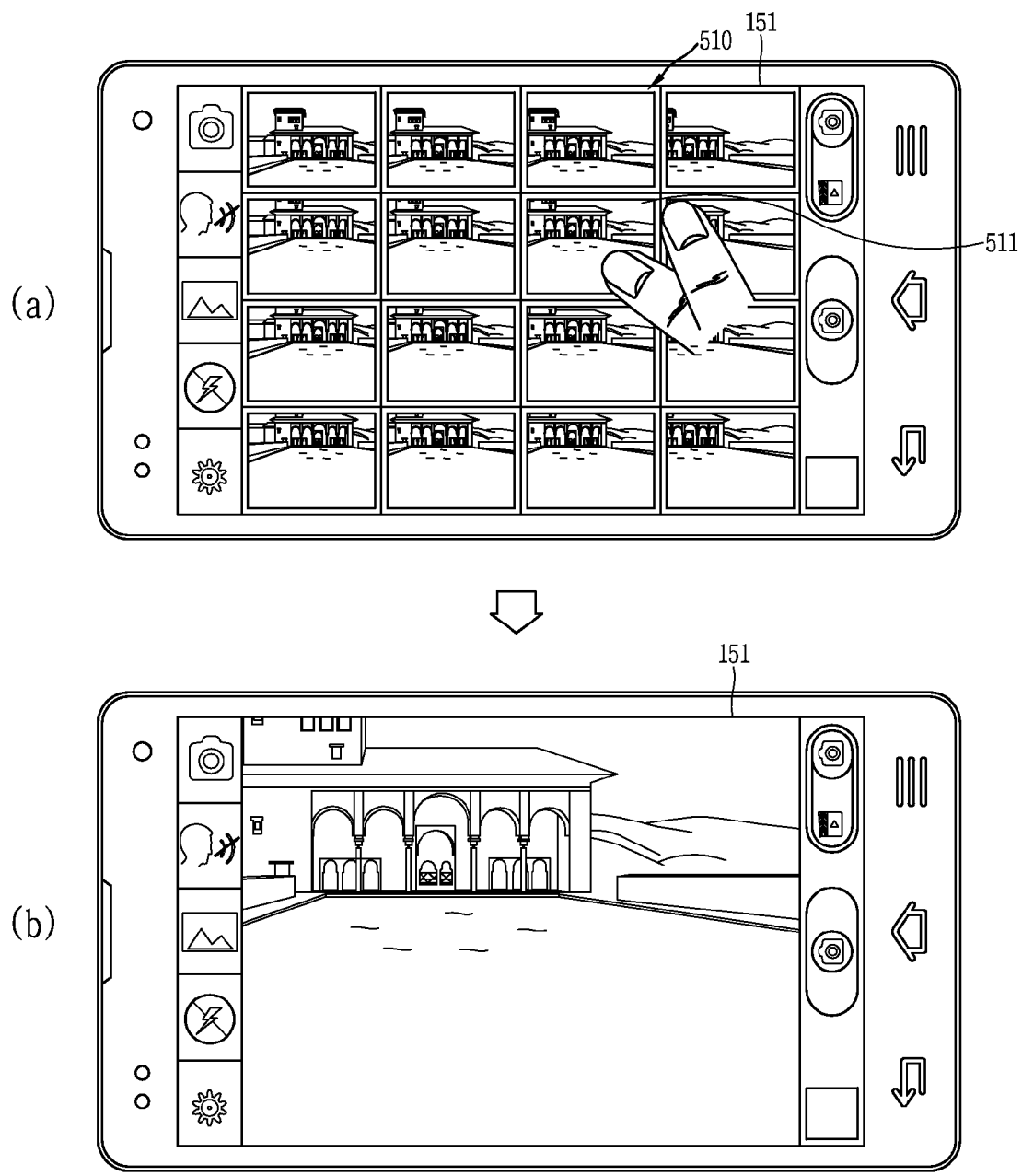
FIGS. 5A, 5B, 6A, 6B, 6C and 7 are conceptual views for explaining a method of adjusting the size of an image displayed on a mobile terminal according to an embodiment of the present disclosure.

As described above, in a mobile terminal according to an embodiment of the present disclosure, images entered through a plurality of lenses may be displayed at the same time in one display region 510 as illustrated in FIG. 5A(a). In other words, the controller 180 may partition the display region 510 into a plurality of regions to correspond to a plurality of numbers of lenses, and display any one of images entered through the plurality of lenses for each of the plurality of regions.

On the other hand, when a touch with a preset scheme being applied to a plurality of regions or a region displayed with an image is sensed or detected, the controller 180 may execute a function matched to (or defined as or corresponding to) the preset scheme in response to the sensed or detected touch.

For example, when a touch with a preset scheme (for example, a short touch, a double touch, a long touch, a pinch-in touch, etc.) is applied to any one region (or image) 511 as illustrated in FIGS. 5A(a) and 5B(a), the controller 180 may enlarge the display size of an image being displayed in the any one region (or image) 511 as illustrated in FIGS. 5A(b) and 5B(b). Accordingly, the user may immediately use an image desired to be viewed in an enlarged size through a touch to the region or image.

Figure 5B:
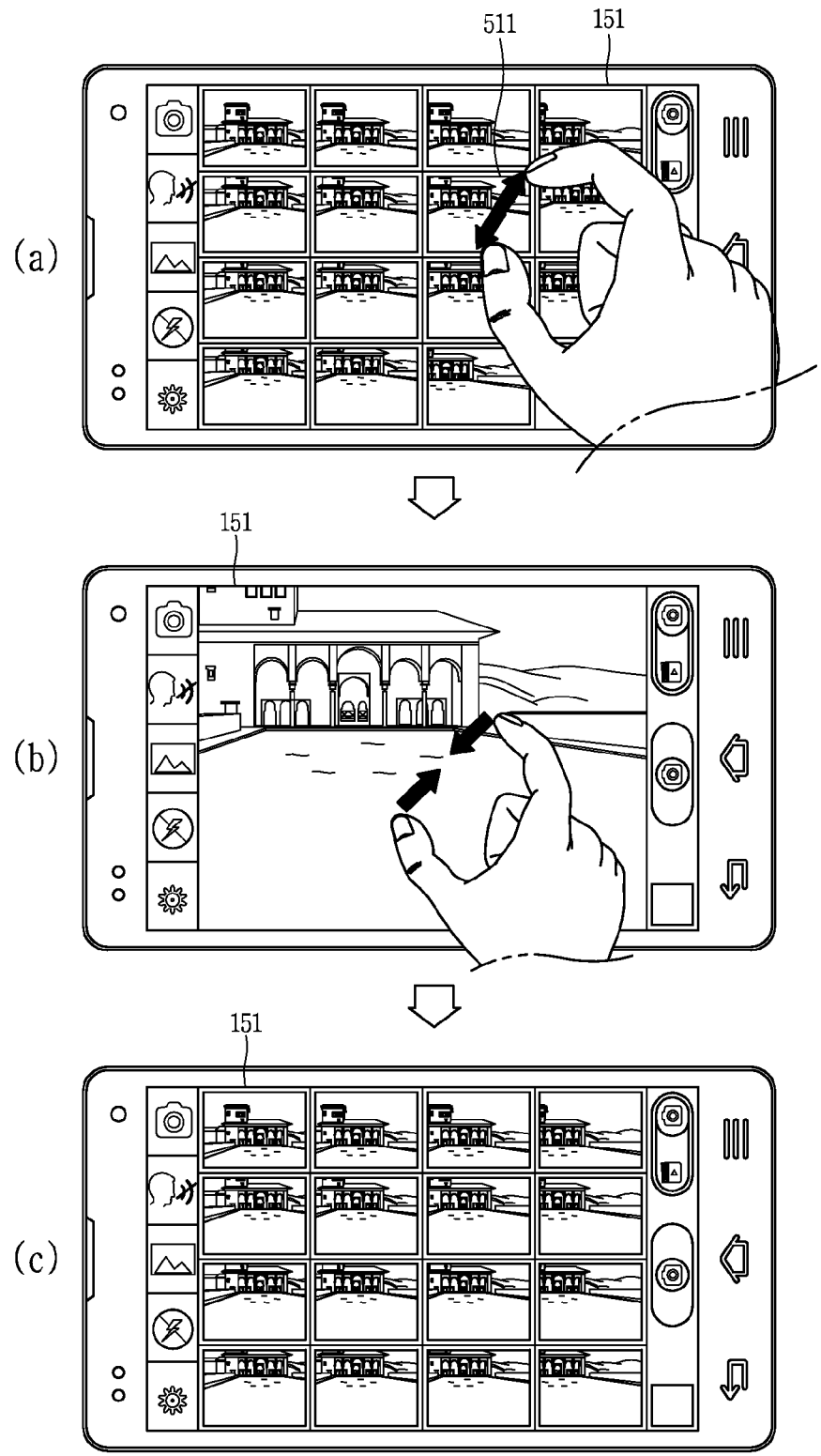

Furthermore, the controller 180 may control the display unit 151 such that a plurality of images are displayed again in response to a touch with a preset scheme to the enlarged image as illustrated in FIGS. 5B(b) and 5B(c).

Figure 6A:
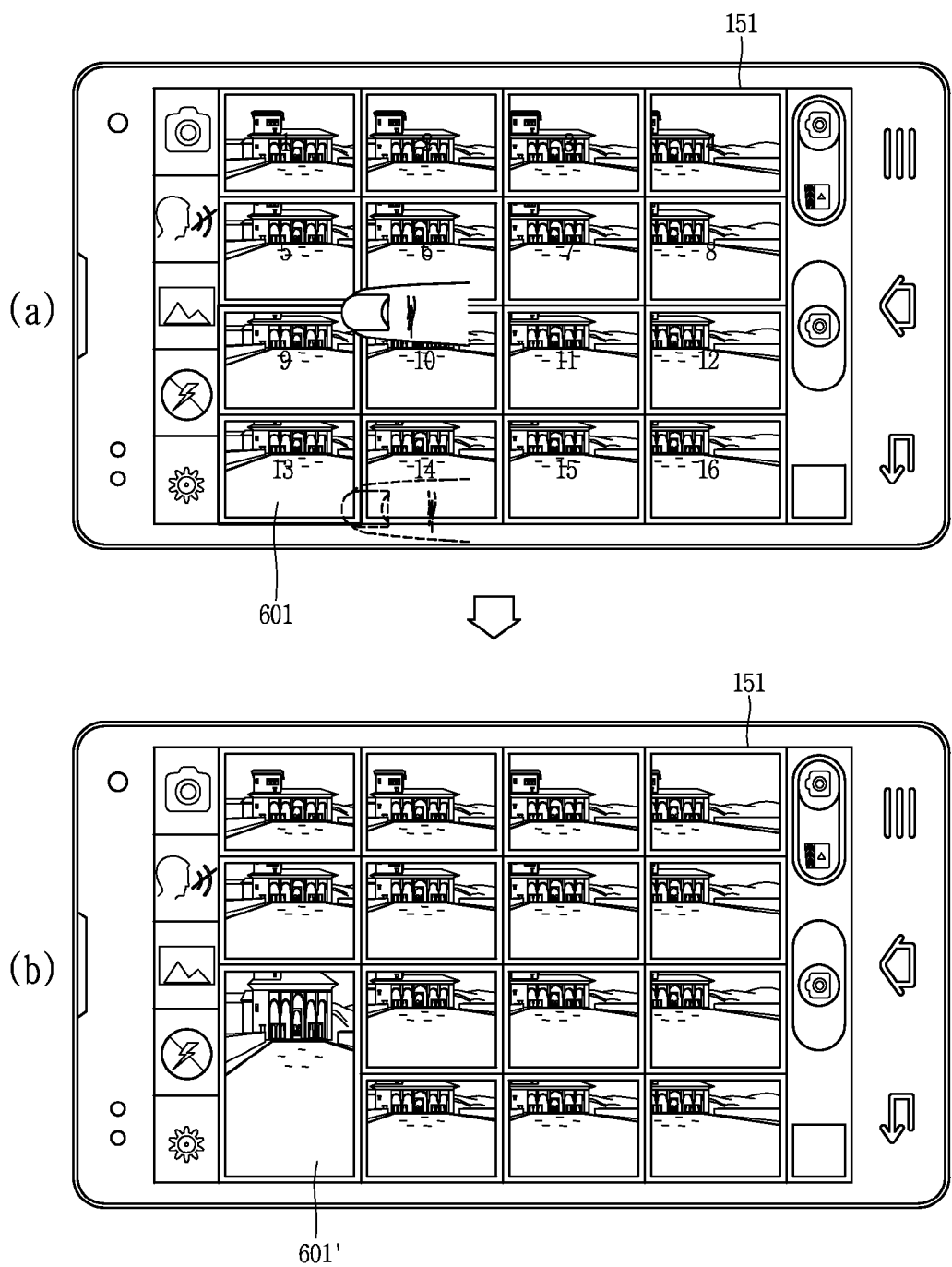

Furthermore, the controller 180 may display an image displayed in a region 601 in an enlarged size as illustrated in FIG. 6A(b) in correspondence to a drag touch to the any one region 601 as illustrated in FIG. 6A(a). In this case, the controller 180 may adjust the enlarged size of an image according to a drag level to the region 601. The controller 180 may further enlarge an image as the length of the drag becomes large.

Figure 6B:
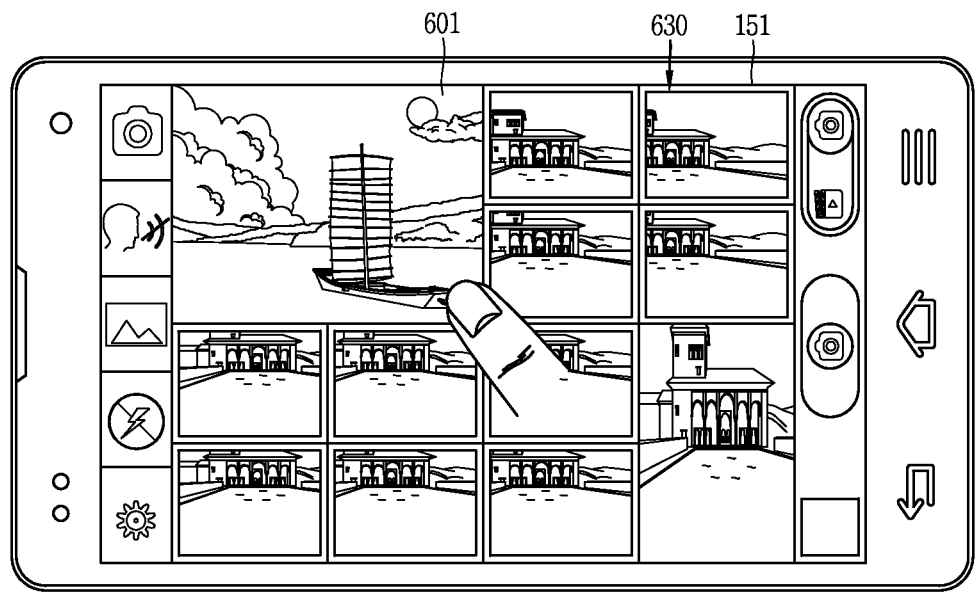

On the other hand, when any one region 601 is dragged as illustrated in FIG. 6A(a), the size of the other regions or the size of the other images can be changed dependent on the size of the dragged region 601 being changed as illustrated in FIG. 6B. Though not shown in the drawing, when the extent of dragging the any one region 601 is greater than a reference value or reference length, the controller 180 may display the any one region as a whole on the display region 630 displayed with images.

Figure 6C:
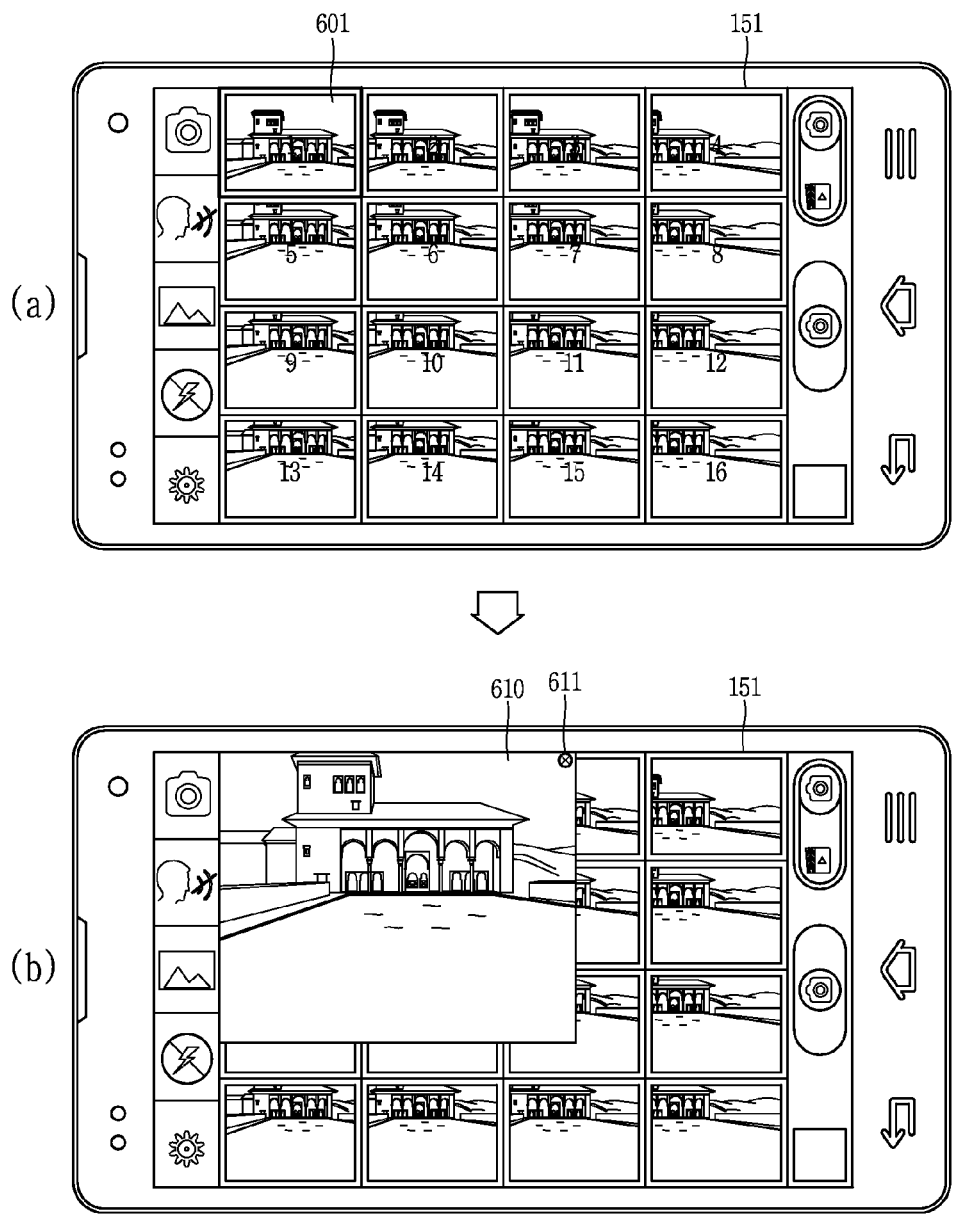
Figure 7:
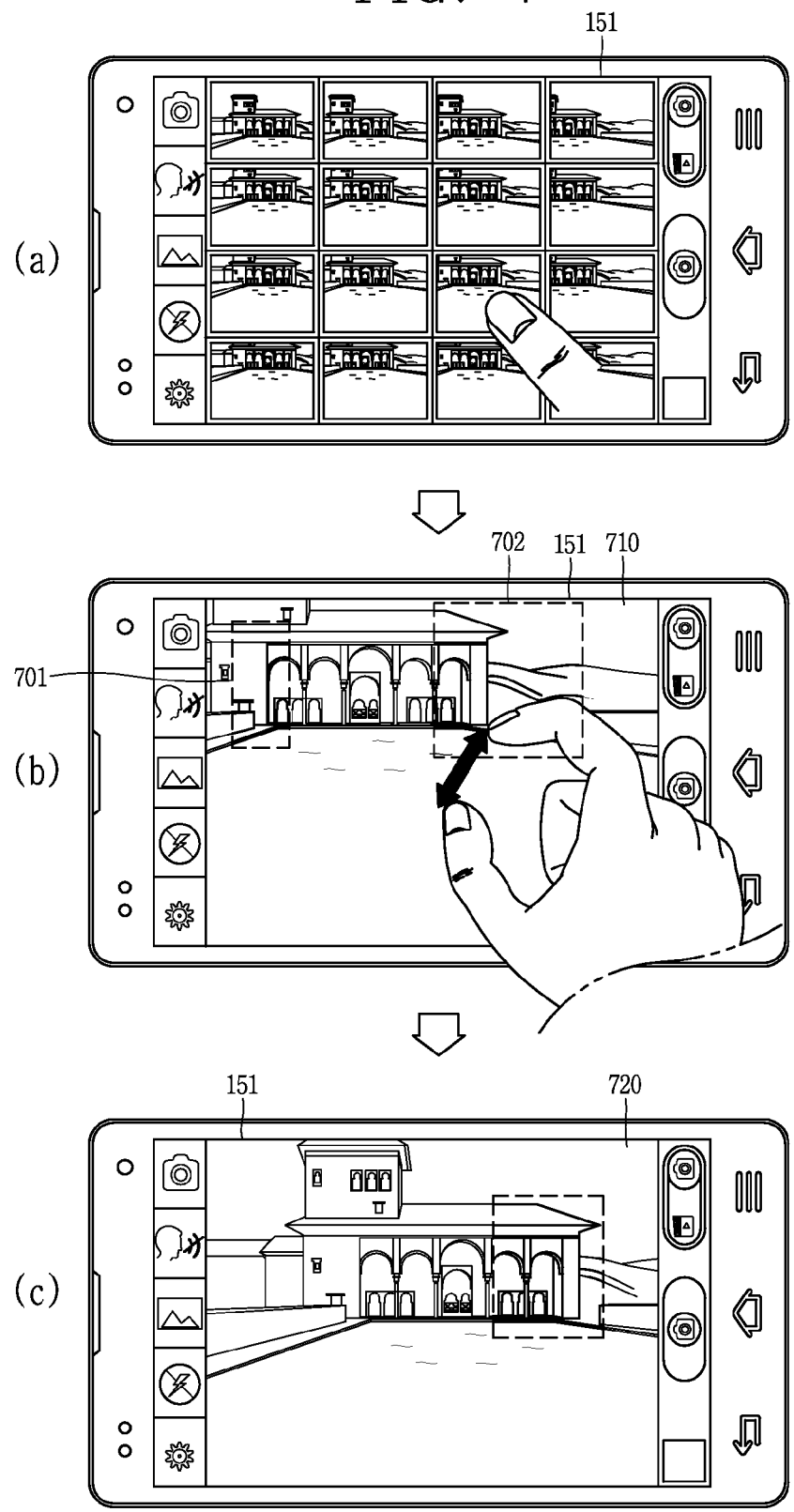

Furthermore, the controller 180 may display an image corresponding to any one region or an image to which a touch with a preset scheme is applied in an enlarged size using a popup window 610 in correspondence to a touch with the preset scheme (for example, a drag, a hold-and-drag, a short touch, a long touch, etc.) to the any one region or image as illustrated in FIG. 6C(a). The display location and display size of the popup window 610 may be changed in correspondence to a touch to the popup window 610. Furthermore, when a region in which the popup window 610 is not displayed is selected, the popup window 610 may not be displayed any more on the display unit 151. Furthermore, the display on the display unit 151 may be terminated based on a function icon 611 contained in the popup window 610 being selected.

Furthermore, when a touch with a preset scheme (for example, a short touch, a long touch, a drag touch, a swipe touch, a pinch-in or pinch-out touch, etc.) is applied to the other region 702 other than a region 701 (refer to FIG. 7B) on which it is focused in a currently displayed image 710 in a state that any one image is displayed in an enlarged size as illustrated in FIGS. 7A and 7B, the controller 180 may display an image 720 focused on the other region 702 on the display unit as illustrated in FIG. 7C. In this manner, the controller 180 may display any one image in an enlarged size in correspondence to the any one of images entered through a plurality of lenses being selected, and when one region of the enlarged image is selected, the controller 180 may display an image focused on the selected one region among images entered through the plurality of lenses in an enlarged size instead of the enlarged image.

Figure 8A:
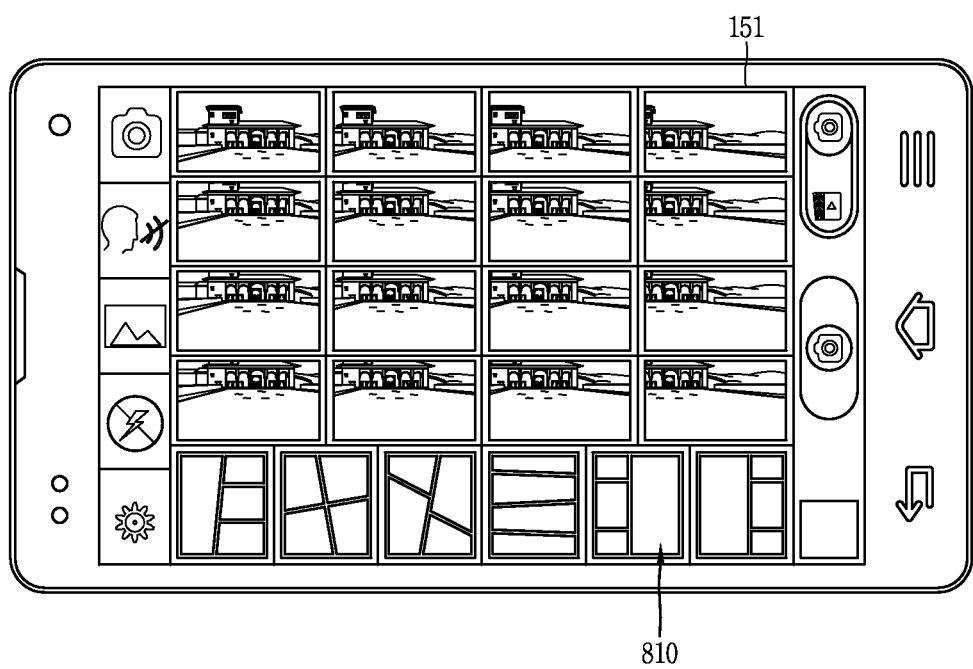
FIGS. 8A and 8B are conceptual views for explaining a method of disposing an image in a mobile terminal according to an embodiment of the present disclosure.
Figure 8B:
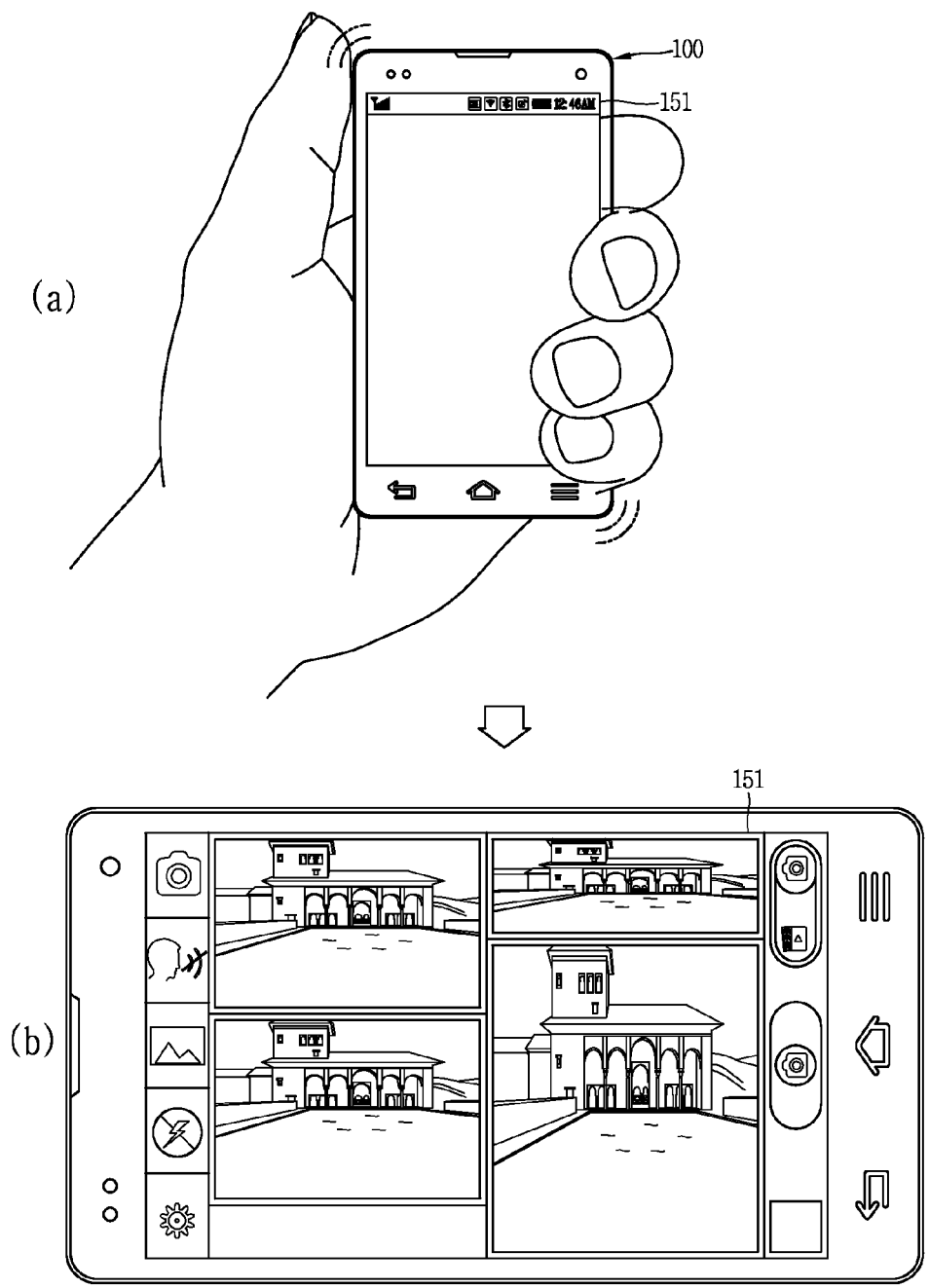

Hereinafter, a method of arranging images in various arrangements will be described in more detail with reference to the accompanying drawings. FIGS. 8A and 8B are conceptual views for explaining a method of disposing an image in a mobile terminal according to an embodiment of the present disclosure.

In a mobile terminal according to an embodiment of the present disclosure, images entered through a plurality of lenses may be displayed in various formats in addition to the foregoing format. For example, as illustrated in FIG. 8A, at least one template (or frame) containing regions displayed with images entered through a camera may be displayed in one region 810 of the display unit 151. Furthermore, though not shown in the drawing, when any one of the templates is selected, images entered through a plurality of lenses may be arranged on the template. Furthermore, when a capture command is received, the controller 180 may store an image along with the template. Accordingly, the user can obtain a visual effect like an image being inserted into a picture frame.

Furthermore, though not shown in the drawing, when the number of regions displayed with images contained in a template is less than that of images entered through a plurality of lenses, the controller 180 may select images to be contained in the template with the help of the user or automatically select images to be contained in the template. Furthermore, the controller 180 may change images to be contained in the template based on the user's selection even after images are contained in the template.

Furthermore, in a mobile terminal according to an embodiment of the present disclosure, when a physical force is applied to the terminal body 100 as illustrated in FIG. 8B(a), the arrangement order of images, the size of images, the color, brightness, contrast, and the like of images may be changed as illustrated in FIG. 8B(b).

When a preset motion of the terminal body 100 is sensed through a motion recognition sensor (not shown) contained in the sensing unit 140, the controller 180 may change the arrangement of images. Here, the motion recognition sensor may include at least one of a terrestrial magnetism sensor, a gyro sensor, and an acceleration sensor. The terrestrial magnetism sensor is a sensor for detecting the direction and size of terrestrial magnetism. The gyro sensor is a sensor for detecting the rotation speed of the body and generating an electrical signal using the detected rotation speed. The acceleration sensor is a sensor for measuring the direction of the gravitational acceleration, detecting a change of the acceleration in any one direction, and generating the electrical signal using the detected change of the acceleration.

As illustrated in FIG. 8B(b), when the arrangement order of images, the size of images, the color, brightness, contrast, and the like of images are changed due to the motion of the terminal body 100, and then the motion of the terminal body 100 is sensed again, the controller 180 may change the arrangement order of images, the size of images, the color, brightness, contrast, and the like of images again.

Furthermore, when the arrangement order of images, the size of images, the color, brightness, contrast, and the like of images are changed, and then a capture command is received, the controller 180 may store the state of images being changed due to the motion of the terminal body 100 as it is in the memory 160.

Figure 9A:
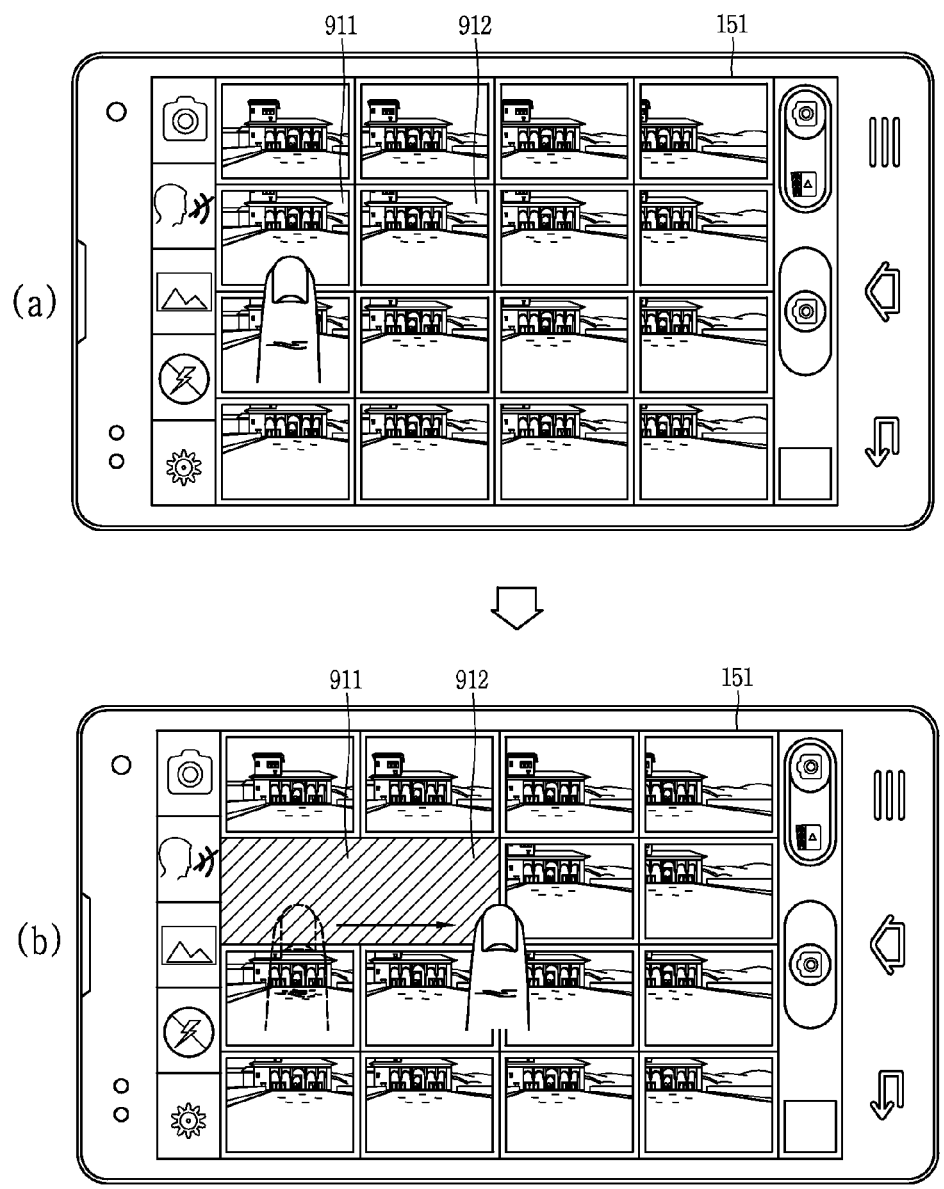
FIGS. 9A, 9B and 9C are conceptual views for explaining a method of changing the activation state of a lens in a mobile terminal according to an embodiment of the present disclosure.
Figure 9B:
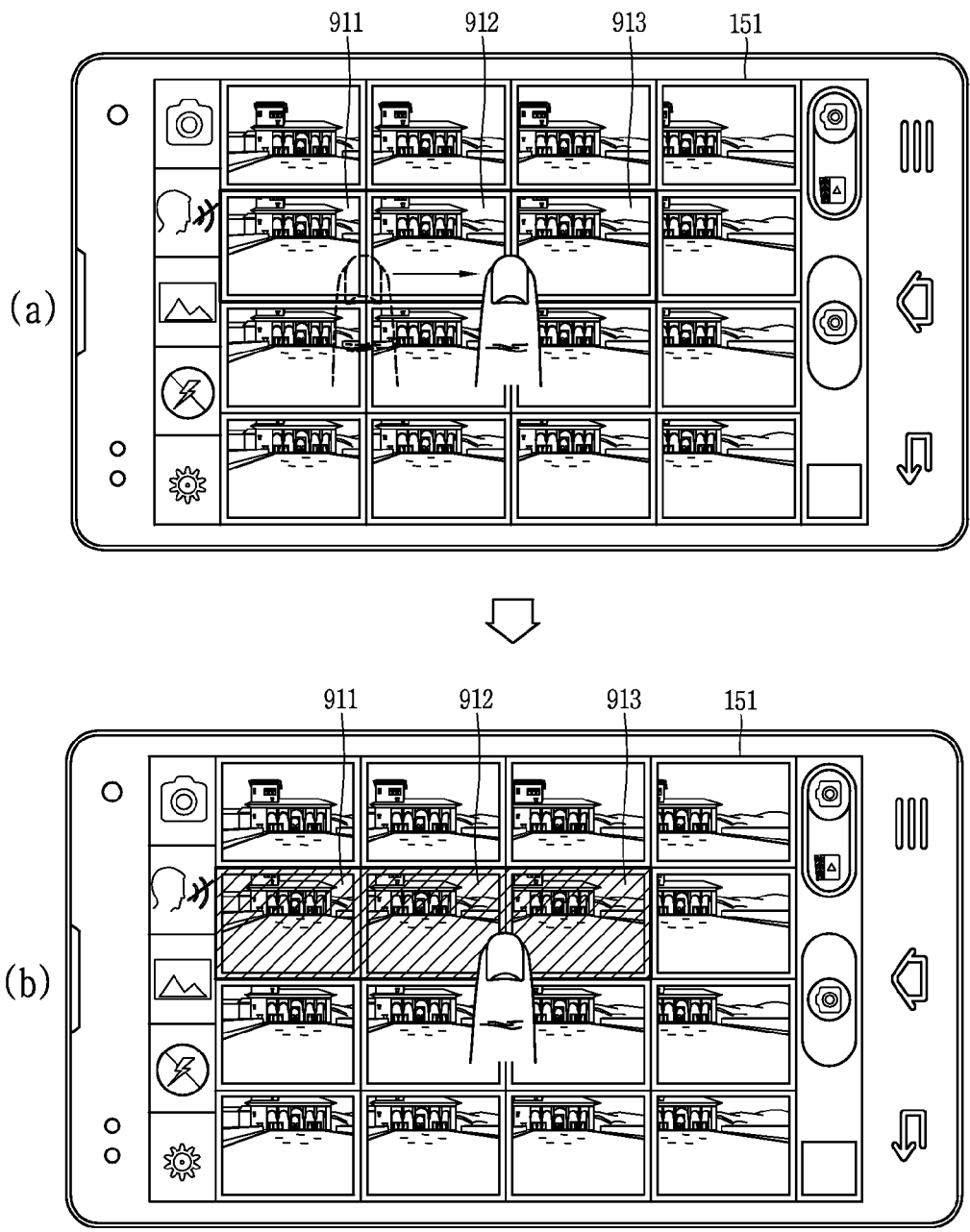
Figure 9C:
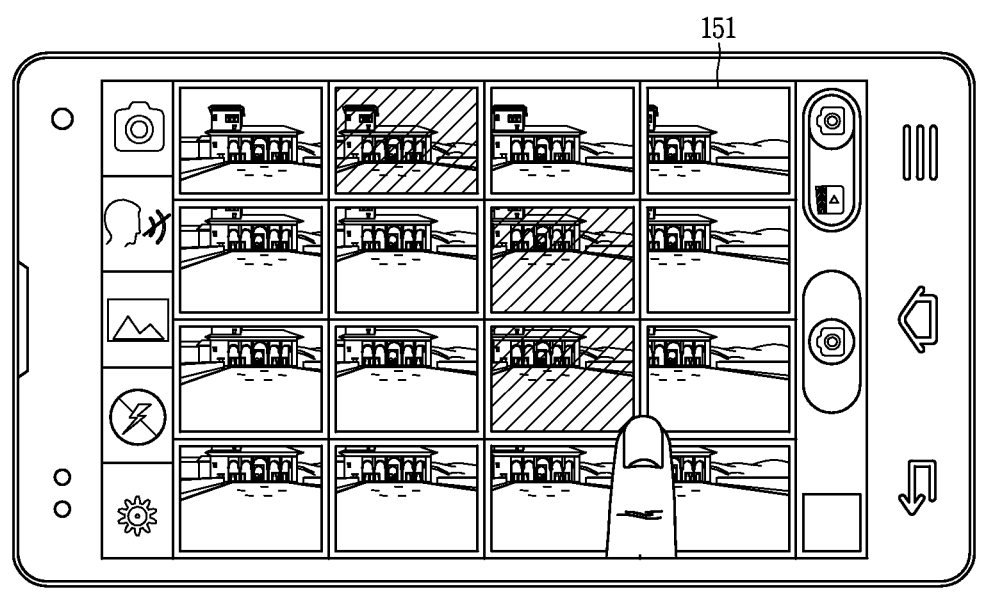

Hereinafter, a method of changing the activation state of at least one of a plurality of lenses will be described in more detail with reference to the accompanying drawings. FIGS. 9A, 9B and 9C are conceptual views for explaining a method of changing the activation state of a lens in a mobile terminal according to an embodiment of the present disclosure.

In a mobile terminal according to an embodiment of the present disclosure, the activation state of at least one of a plurality of lenses provided in a camera may be changed. Here, the "state of lens being activated" denotes a state in which an image is entered through a lens, and the "state of lens being deactivated" denotes a state in which an image is not entered through a lens. In other words, a lens in the state of lens being activated may be in an ON state, and a lens in the state of lens being deactivated may be in an OFF state.

Whether or not to deactivate which one of a plurality of lenses may be set through a separate setting menu.

Furthermore, according to an embodiment of the present disclosure, the controller 180 may determine whether or not to deactivate which one of a plurality of lenses based on a touch to the displayed image in a state that images entered through a plurality of lenses are displayed on the display unit 151.

For an example, when a touch with a preset scheme (for example, a short touch, a long touch, a double touch, a multi touch, etc.) is applied to a region displayed with any one of the images entered through a plurality of lenses, the controller 180 may deactivate a lens that receives an image displayed in a region to which a touch with the preset scheme is applied. Furthermore, when a touch with the preset scheme is applied, the controller 180 may display a popup window or the like to select whether or not to deactivate a lens corresponding to the region or image to which the touch is applied with the help of the user.

Furthermore, as illustrated in FIGS. 9A(a), 9A(b), 9B(a) and 9B(b), when a drag touch is applied in subsequence to a touch with the preset scheme to any one region 911, the controller 180 may deactivate a lens that receives an image displayed in a region 911 to which a touch with the preset scheme is applied and at least one lens that receives at least one image displayed in regions 912, 913 to which the drag touch is applied at the same time.

On the other hand, the controller 180 may control the display unit such that the visual appearance of a region that has been displayed with an image that has been entered through the deactivated lens is distinguished from that of a region displayed with an image entered through an activated lens. For example, as illustrated in FIGS. 9A and 9B, the controller 180 may display an image with a preset color or make it blind in a region on which an image corresponding to the deactivated lens is displayed. Furthermore, as illustrated in FIG. 9C, the controller 180 may adjust the transparency of a region displayed with an image corresponding to the deactivated lens. Furthermore, as illustrated in FIG. 9C, the controller 180 may provide shading to a region displayed with an image corresponding to the deactivated lens to process it with a shade.

Hereinafter, a method of changing the setting information of an image will be described in more detail with reference to the accompanying drawings. FIGS. 10A, 10B, 10C, 10D, and 11 are conceptual views for explaining a method of changing the setting value of a lens in a mobile terminal according to an embodiment of the present disclosure.

In a mobile terminal according to an embodiment of the present disclosure, attribute information on only any one of a plurality of lenses or the image of the any one lens may be changed, and otherwise, attribute information on at least one of a plurality of lenses or the at least one lens may be changed at the same time.

Figure 10A:
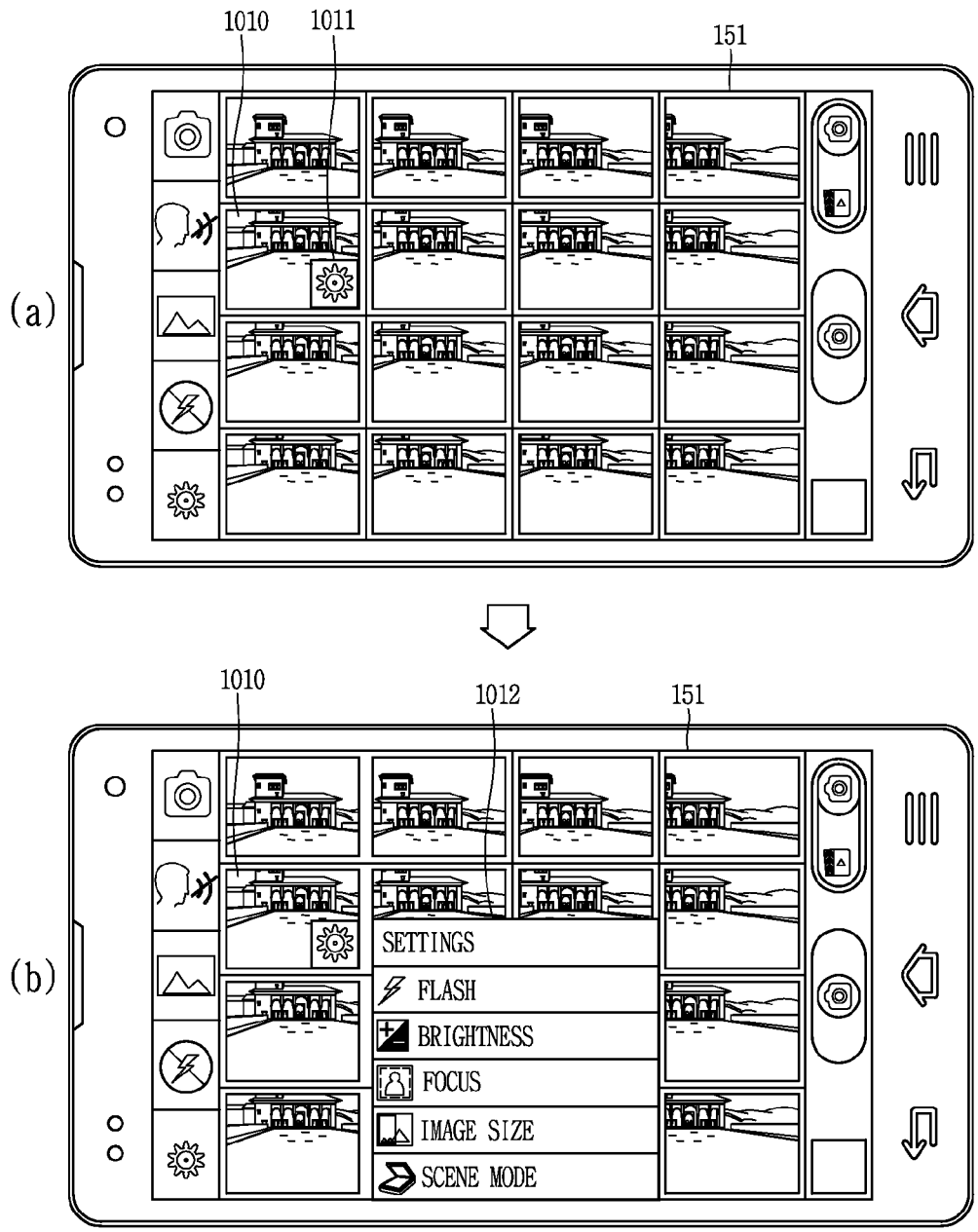
FIGS. 10A, 10B, 10C, 10D and 11 are conceptual views for explaining a method of changing the setting value of a lens in a mobile terminal according to an embodiment of the present disclosure.

For example, as illustrated in FIG. 10A(a), when a touch with a preset scheme is applied to any one region or image 1010, the controller 180 may display a function icon 1011 to allow a setting menu 1012 for changing the attribute information of a lens or image corresponding to the region or image to be displayed thereon. The function icon 1011 may be displayed within the region 1010 or around the region 1010.

Furthermore, when the function icon 1011 is selected, the controller 180 may display a setting menu 1012 as illustrated in FIG. 10A(b). Furthermore, when a touch with a preset scheme is applied to any one region or image 1010, the controller 180 may immediately display the 1012 without displaying the function icon 1011. The user may change the attribute information of a lens or image using a setting item contained in the setting menu 1012. Here, the attribute information may include various information associated with image capture, such as image brightness, image size, capture mode, ISO value, flash on/off, automatic capture mode, timer, and the like.

Figure 10B:
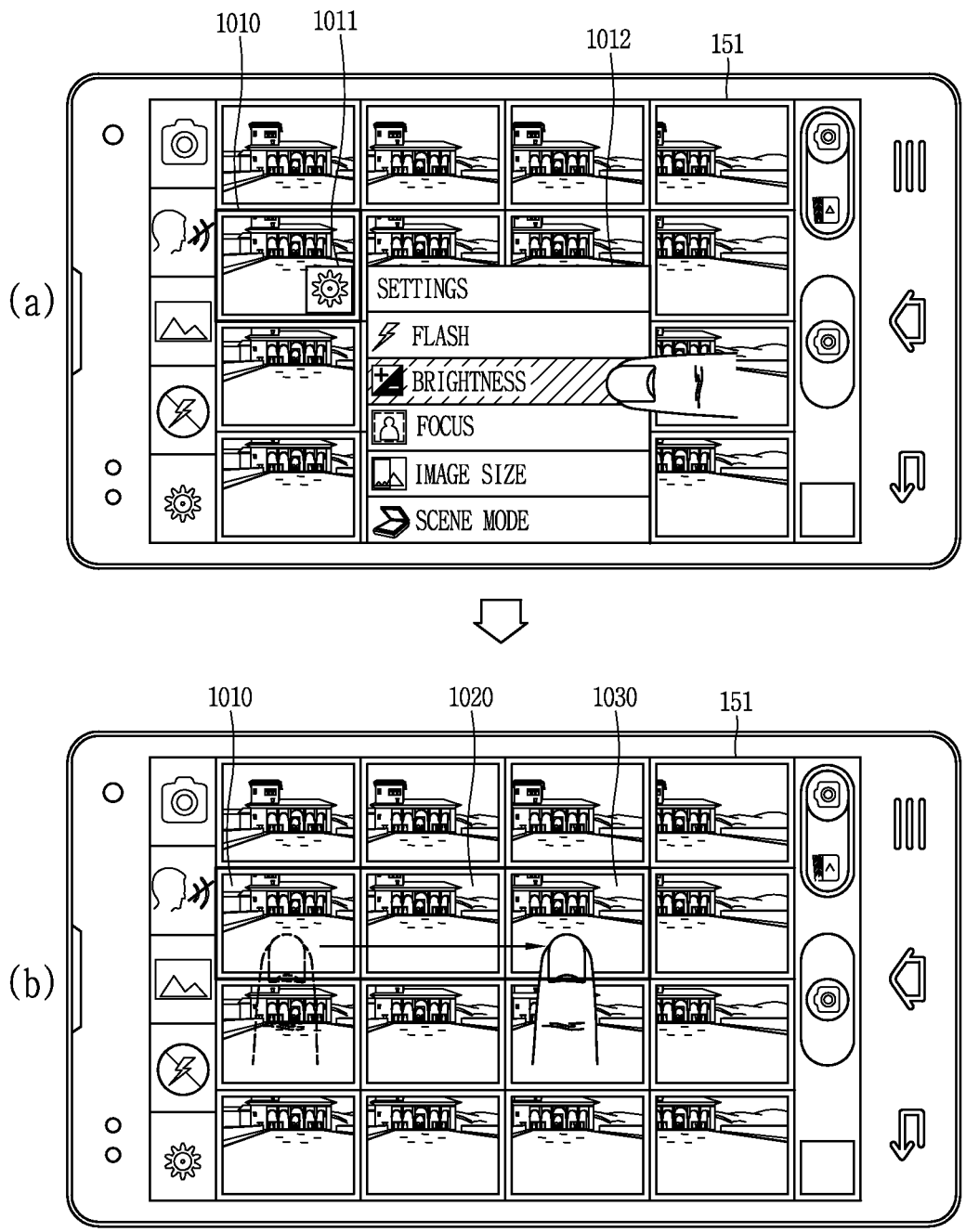

On the other hand, in a mobile terminal according to an embodiment of the present disclosure, as illustrated in FIG. 10B(a), the attribute information of an image contained in any one region 1010 (or attribute information of any one image 1010) may be changed, and then the attribute information of an image contained in at least one another region (or image) 1020, 1030 in correspondence to a touch input with a preset scheme to another region, for example, a drag touch input starting from the any one region (or image) 1010 to at least one another region (or image) 1020, 1030, may be changed in a similar manner to attribute information corresponding to the any one region 1010.

For another example, the controller 180 may change attribute information on the any one region 1010, and then change the attribute information of an image or lens corresponding to another region (not shown) in correspondence to a short touch, a long touch or double touch to the another region in a similar manner to the attribute information corresponding to the any one region 1010.

Accordingly, the user may collectively change the attribute information of images without changing them one by one. Furthermore, the controller 180 may change the attribute information of an image corresponding to the another region 1020, 1030 only when a touch with the preset scheme is applied within a preset period of time after the attribute information of an image corresponding to the any one region 1010 is changed.

Figure 10C:
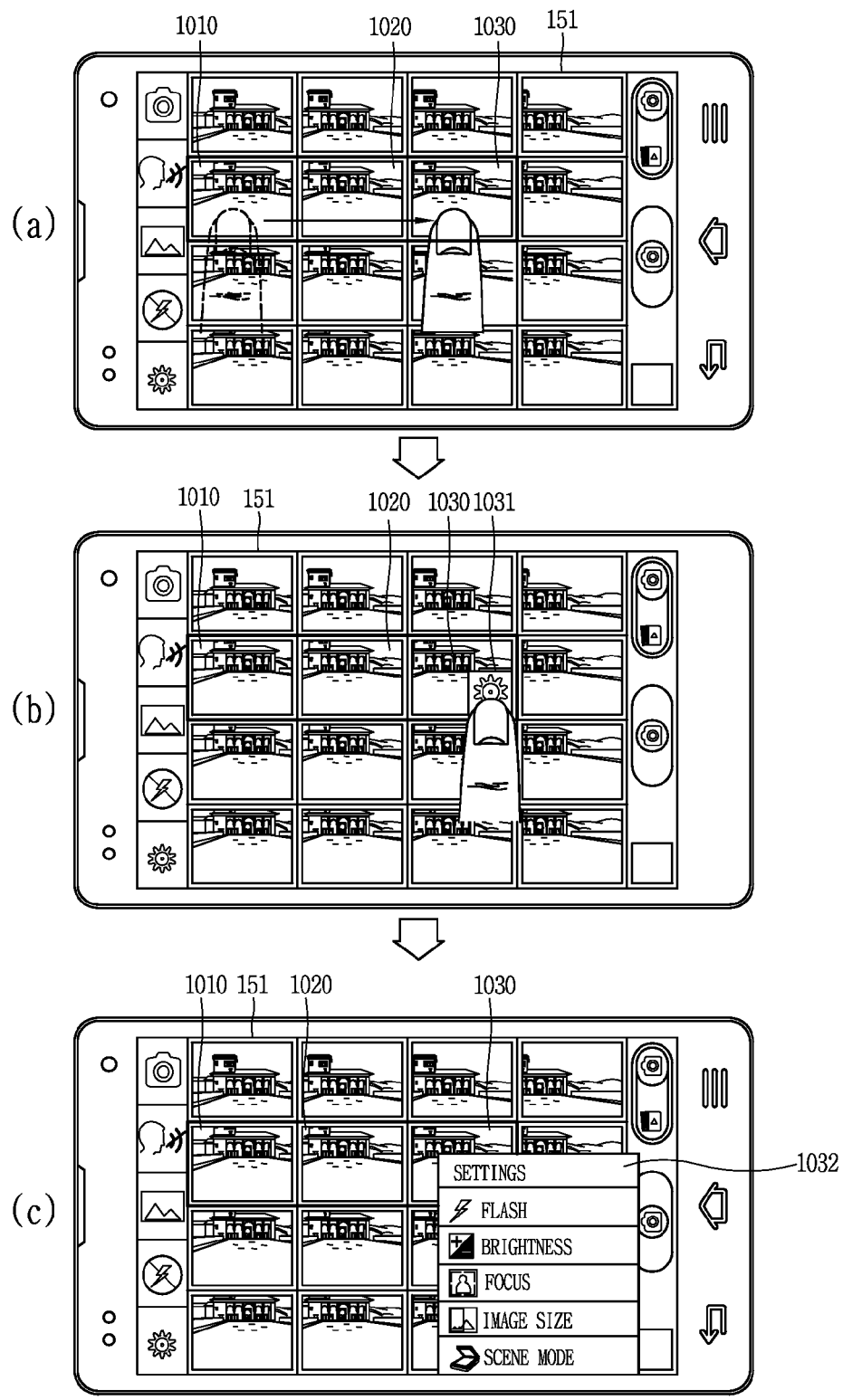

For still another example, in a mobile terminal according to an embodiment of the present disclosure, a plurality of regions 1010, 1020, 1030 are first selected as illustrated in FIG. 10C(a), and then a function icon 1031 or setting menu 1032 for changing the attribute information of a lens or image corresponding to the plurality of regions as illustrated in FIGS. 10C(b) and 10C(c) may be displayed.

Figure 10D:
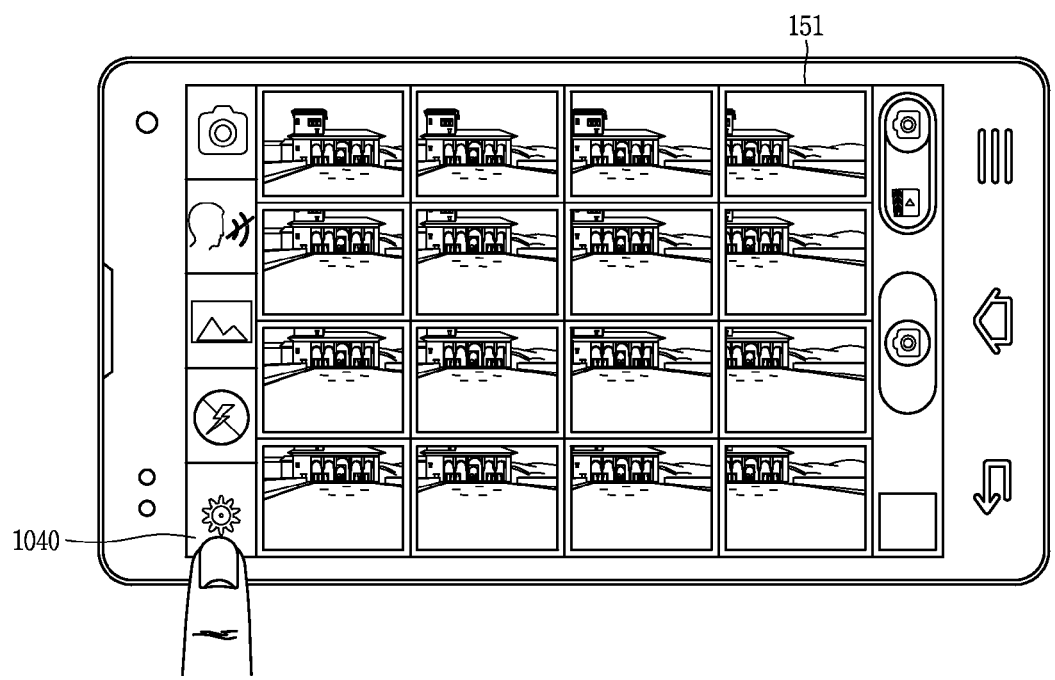

Furthermore, in a mobile terminal according to an embodiment of the present disclosure, as illustrated in FIG. 10D, a function icon 1040 for changing attribute information may be displayed in a separate region to change the attribute information of images entered through a plurality of lenses or attribute information associated with a capture at once. When the function icon 1040 is selected, a popup window including setting menu information or the like may be displayed. Furthermore, the user may collectively change attribute information on a plurality of all images or selectively change attribute information on at least one of the plurality of images through the setting menu information.

Figure 11:
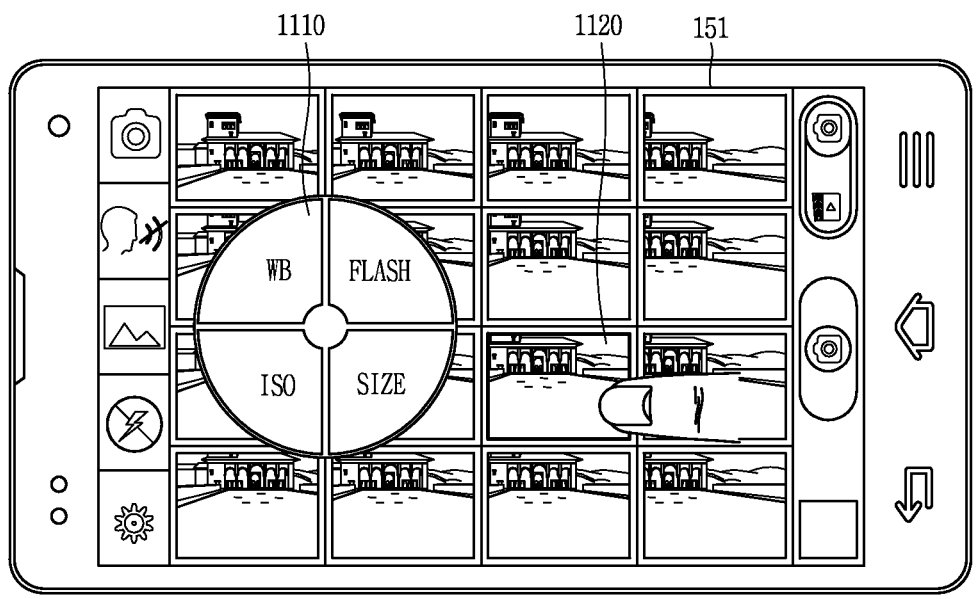

Furthermore, a setting menu screen may be displayed through a GUI 1110 in a format as illustrated in FIG. 11. Meanwhile, when a request for changing attribute information on any one region or image 1120 is individually received, the controller 180 may display a GUI 1110 around the region or image as illustrated in the drawing. The setting menu GUI 1110 displayed around the region or image may include only some of a plurality of setting items for changing the attribute information of an image.

Figure 12A:
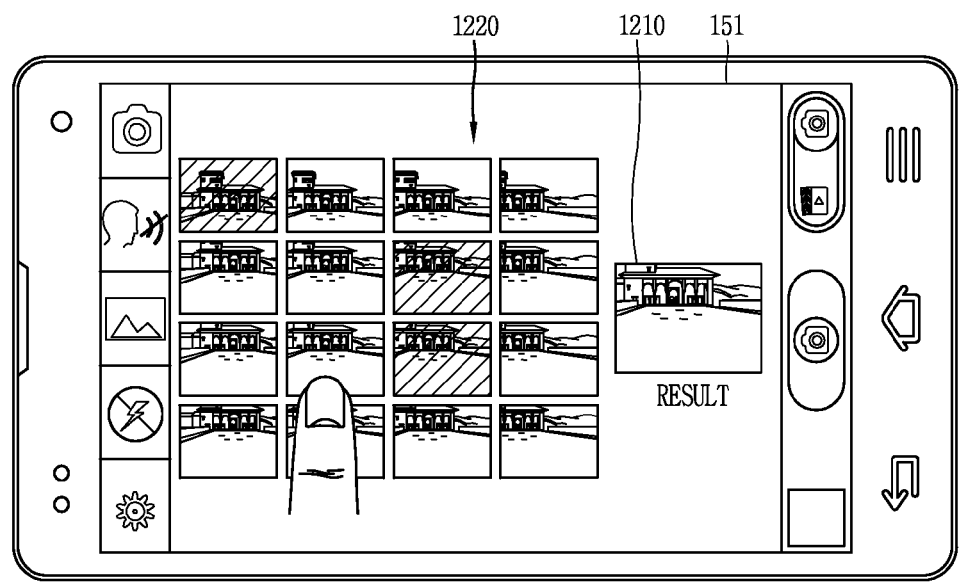
FIGS. 12A, 12B and 12C are conceptual views for explaining a method of synthesizing an image entered through a plurality of lenses in a mobile terminal according to an embodiment of the present disclosure.
Figure 12B:
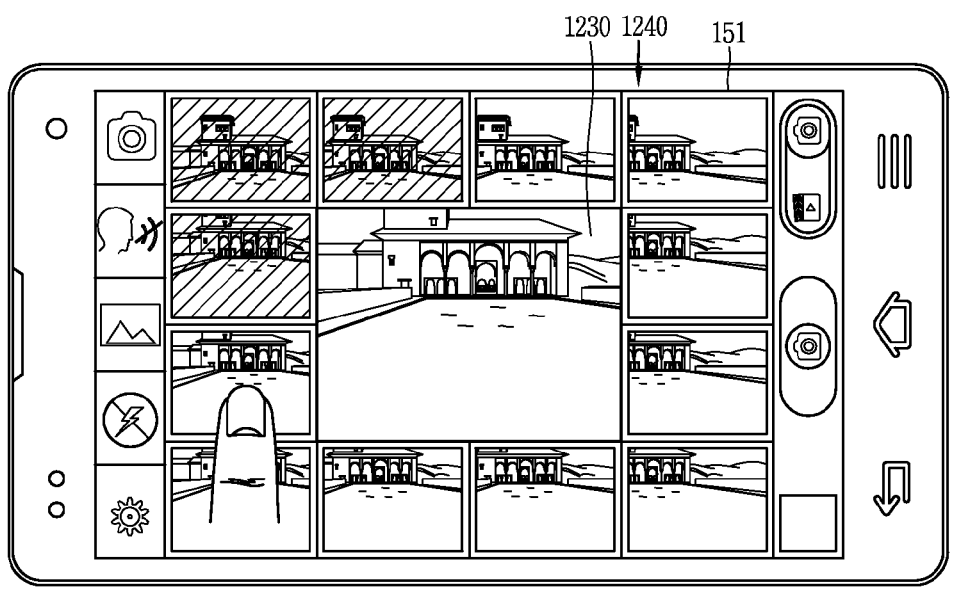
Figure 12C:
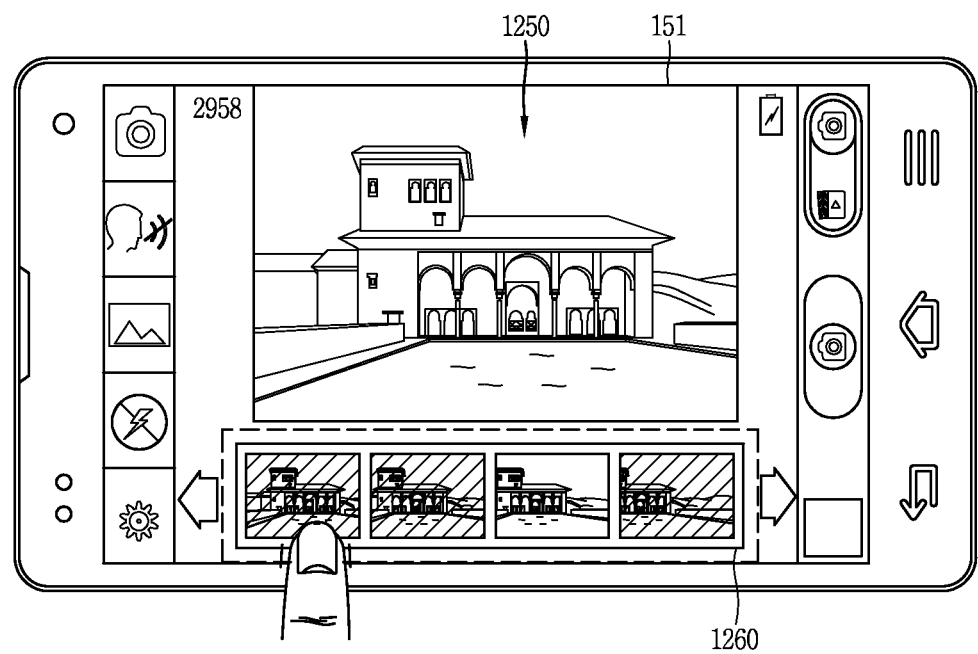

Hereinafter, a method of synthesizing an image using at least two of a plurality of images will be described in more detail with reference to the accompanying drawings. FIGS. 12A, 12B and 12C are conceptual views for explaining a method of synthesizing an image entered through a plurality of lenses in a mobile terminal according to an embodiment of the present disclosure.

In a mobile terminal according to an embodiment of the present disclosure, it may be possible to synthesize at least two of images captured through a plurality of lenses. For example, as illustrated in FIGS. 12A, 12B and 12C, for the captured images, images captured through a plurality of lenses may be displayed in at least one region 1220, 1240, 1260 of the display unit. Furthermore, an image synthesized with at least two images selected by the user among the images entered through a plurality of lenses may be displayed in another region 1210, 1230, 1250.

The controller 180 may perform a HDR or multi-focus composition function using at least two of the plurality of images. The controller 180 may perform a synthesis for reflecting attribute information corresponding to another image on any one image in addition to synthesizing the at least two images themselves. Furthermore, when performing a multi-focus composition function, the controller 180 may synthesize the focal area of any one image with that of another image, thereby synthesizing at least two images such that at least two focal areas are contained in one image. Furthermore, the controller 180 may synthesize images captured through a plurality of lenses to generate one image. In this case, the user can receive an image with a wider field of view than that entered through one lens.

On the other hand, the controller 180 can perform an additional synthesis function by selecting another image in a state that the synthesized image has been stored or synthesized.

As described above, in a mobile terminal and a control method thereof according to an embodiment of the present disclosure, at least two of images entered through a plurality of lenses may be synthesized according to the user's convenience, thereby further increasing the usefulness of a camera provided with a plurality of lenses.

On the other hand, in the foregoing embodiments, a method of displaying a preview image has been described as an example, but the foregoing embodiments may be also applicable in a similar manner to captured images subsequent to the capture of the images, and the detailed description of the relevant embodiments subsequent to the capture of the images will be substituted by the description of embodiments for the preview image.

As described above, in a mobile terminal and a control method thereof according to an embodiment of the present disclosure, images entered through a plurality of lenses may be displayed on one screen. Accordingly, a user may receive a plurality of images at once, thereby recognizing his or her desired images being captured through which one of the lenses.

Furthermore, in a mobile terminal and a control method thereof according to an embodiment of the present disclosure, it may be possible collectively control at least one lens in correspondence to a touch to a region displayed with a plurality of images displayed on the display unit. Accordingly, the user can enhance convenience.

Furthermore, according to an embodiment disclosed in the present disclosure, the foregoing method may be implemented as codes readable by a processor on a medium written by a program. Examples of the processor-readable media may include ROM, RAM, CD-ROM, magnetic tape, floppy disk, and optical data storage device, and the like, and also include a device implemented in the form of a carrier wave (for example, transmission via the Internet).

The configurations and methods according to the above-described embodiments will not be applicable in a limited way to the foregoing mobile terminal, and all or part of each embodiment may be selectively combined and configured to make various modifications thereto.

What is claimed is:

1. A mobile terminal, comprising:
    a display unit;
    a camera arranged with a plurality of lenses along a plurality of lines; and
    a controller configured to:
        cause displaying of images of an object received through the plurality of lenses in a preset arrangement on the display unit;
        capture at least one of the images in response to a capture request, wherein the images are displayed on a plurality of regions of the display unit such that each region of the plurality regions displays an image of the object processed through a corresponding one of the plurality of lenses, and wherein a total number of the plurality of regions corresponds to a total number of the plurality of lenses;
        change from an active state to an inactive state for a part of the camera associated with at least one of the plurality of lenses based on a touch input applied to at least one region of the plurality of regions on the display unit, the at least one region corresponding to the at least one of the plurality of lenses, wherein the touch input is applied to the at least one region while the images of the object are being displayed on the plurality of regions; and
        blind the at least one region on the display unit when the part of the camera associated with the at least one of the plurality of lenses is changed to the inactive state in response to the touch input applied to the at least one region such that a visual appearance of the at least one region corresponding to the part of the camera in the inactive state is distinguished from other regions of the plurality of regions that have been processed by other parts of the camera in the active state.

2. The mobile terminal of claim 1, wherein the preset arrangement corresponds to an order of arranging the plurality of lenses.

3. The mobile terminal of claim 1, wherein the controller executes a function defined by a touch with a preset scheme in response to application of the touch with the preset scheme to the at least one region of the plurality of regions being detected.

4. The mobile terminal of claim 3, wherein when the application of a first touch to any one of the plurality of regions is detected, the controller enlarges a display size of an image being displayed in the any one of the plurality of regions.

5. The mobile terminal of claim 4, wherein the controller divides the display unit into a first region displayed with the enlarged image and a second region displayed with at least one image excluding the enlarged image among images that have been displayed in the plurality of regions, and changes an image that has been displayed in the first region to any one image to which a touch input is applied when the touch input is applied to the any one image displayed in the second region.

6. The mobile terminal of claim 5, wherein when the capture request is received, the enlarged image in the first region and the at least one image in the second region are captured at the same time.

7. The mobile terminal of claim 1, wherein a display size of an image displayed in any one region of the plurality of regions is adjusted in response to a drag input applied to the any one region.

8. The mobile terminal of claim 1, wherein the controller synthesizes attribute values of at least two images selected by a user among the images displayed on the display unit to generate a synthesized image.

9. A control method at a mobile terminal comprising a camera arranged with a plurality of lenses along a plurality of lines, the method comprising:
    displaying, on a display unit of the mobile terminal, images of an object entered through the plurality of lenses in a preset arrangement;
    receiving a capture request;
    capturing at least one of the images entered through the plurality of lenses in response to the capture request, wherein the images of the object entered through the plurality of lenses are displayed on a plurality of regions of the display unit such that each region of the plurality regions displays an image of the object entered through a corresponding one of the plurality of lenses, and wherein a total number of the plurality of regions corresponds to a total number of the plurality of lenses;
    changing from an active state to an inactive state for a part of the camera associated with at least one of the plurality of lenses based on a touch input applied to at least one region of the plurality of regions on the display unit, the at least one region corresponding to the at least one of the plurality of lenses, wherein the touch input is applied to the at least one region while the images of the object are being displayed on the plurality of regions; and blinding the at least one region on the display unit when the part of the camera associated with the at least one of the plurality of lenses is changed to the inactive state in response to the touch input applied to the at least one region such at a visual appearance of the at least one region corresponding to the part of the camera in the inactive state is distinguished from other regions of the plurality of regions that have been processed by other parts of the camera in the active state.

10. The method of claim 9, wherein a function defined by a touch with a preset scheme is executed in response to application of the touch with the preset scheme to the at least one region of the plurality of regions being detected.

11. The method of claim 10, further comprising:

enlarging a display size of an image being displayed in any one of the plurality of regions when the application of a first touch input to the any one of the plurality of regions is detected.

* * * * *